United States Patent [19]
Hickey et al.

[11] Patent Number: 5,910,805
[45] Date of Patent: *Jun. 8, 1999

[54] METHOD FOR DISPLAYING BITMAP DERIVED TEXT AT A DISPLAY HAVING LIMITED PIXEL-TO-PIXEL SPACING RESOLUTION

[75] Inventors: Thomas B. Hickey, Columbus, Ohio; Robert J. Haschart, White Bear Lake, Minn.

[73] Assignee: OCLC Online Computer Library Center, Dublin, Ohio

[ * ] Notice: This patent issued on a continued prosecution application filed under 37 CFR 1.53(d), and is subject to the twenty year patent term provisions of 35 U.S.C. 154(a)(2).

[21] Appl. No.: 08/584,408

[22] Filed: Jan. 11, 1996

[51] Int. Cl.⁶ ....................................................... G06F 3/14
[52] U.S. Cl. ........................................... 345/467; 345/147
[58] Field of Search ..................................... 395/167, 168, 395/170, 171, 172, 805, 779, 780; 345/20, 121, 127, 128, 141, 136, 147, 149, 152, 467, 468, 470, 471, 472; 382/266, 298, 299, 301; 707/542, 517, 518

[56] References Cited

U.S. PATENT DOCUMENTS

| | | | |
|---|---|---|---|
| 4,720,705 | 1/1988 | Gupta et al. | 345/20 |
| 4,803,643 | 2/1989 | Hickey | 395/774 |
| 4,851,825 | 7/1989 | Naiman | 345/132 |
| 4,908,780 | 3/1990 | Priem et al. | 395/135 |
| 5,185,852 | 2/1993 | Mayer | 395/109 |
| 5,367,618 | 11/1994 | Ishida | 395/805 |
| 5,444,552 | 8/1995 | Smith, III | 358/465 |
| 5,528,742 | 6/1996 | Moore et al. | 395/805 |
| 5,577,177 | 11/1996 | Collins | 395/169 |
| 5,579,030 | 11/1996 | Karow | 345/143 |
| 5,583,978 | 12/1996 | Collins et al. | 395/170 |
| 5,600,770 | 2/1997 | Kawabata et al. | 395/806 |
| 5,617,525 | 4/1997 | Sugaya | 395/805 |

OTHER PUBLICATIONS

Softfonts, Negroponte, Proceeding, Society for Information Display, 1980, pp. 184–185.
Schmandt, Soft Typography, Information Proceeding '80, Proceedings of IFIPS, pp. 1027–1032.
Wilkes et al, A Soft–Edged Character Set and Its Derivation, Univ. Cambridge, Computer Journal vol. 25, 1982 pp. 140–145.
Gupta, et al., Yoda: An Advanced Display for Personal Computers, IBM J. Res. Develop. vol. 31, No. 1, Jan. 1987.
Warnock, "The Display of Characters Using Gray Level Sample Arrays," Comput. Graph. 14, No. 3, 302–307 (Jul. 1980).
Computer Graphics, Principles and Practice, 2d. Ed. pp. 976–979, Addison–Wesley Co. Inc. 1990.
Naiman, et al. "Rectangular Convolution for Fast Filtering of Charaters", Comp. Sys. Res. Inst. SIGGRAPH '87, Anaheim, Jul. 27–31, 1987.

*Primary Examiner*—Stephen S. Hong
*Attorney, Agent, or Firm*—Mueller and Smith, LPA

[57] ABSTRACT

An image font file is created containing compressed bitmap representations of the characters of one or more fonts utilized for a given text. These compressed bitmap representations are derived as character image templates corresponding with a font of an enlarged size. Upon being conveyed to client software, the individual characters of the image font file are accessed, and while remaining in a compressed format are selectively shifted in accordance with typesetting specification error values, then scaled and filtered to produce a display character in anti-aliased, sub-pixel position format.

21 Claims, 14 Drawing Sheets

CCT is a pioneer in online scholarly publishing. "Online" means, among other things, that you get access immediately to new information as soon as it is available, not after weeks of accepted manuscripts going through the process of printing and mailing. "Scholarly publishing" means that what we publish in CCT will represent the highest standards of scientific information, supported by peer review giving special attention to judgments on study design and statistical assessment. Thus CCT combines the best features in publishing: editorial excellence and technological know-how.

FIG. 1

CCT is a pioneer in online scholarly publishing. "Online" means, among other things, that you get access immediately to new information as soon as it is available, not after weeks of accepted manuscripts going through the process of printing and mailing. "Scholarly publishing" means that what we publish in CCT will represent the highest standards of scientific information, supported by peer review giving special attention to judgments on study design and statistical assessment. Thus CCT combines the best features in publishing: editorial excellence and technological know-how.

FIG. 2 things,
accepted
scientific

FIG. 3A things,
accepted
scientific

FIG. 3B

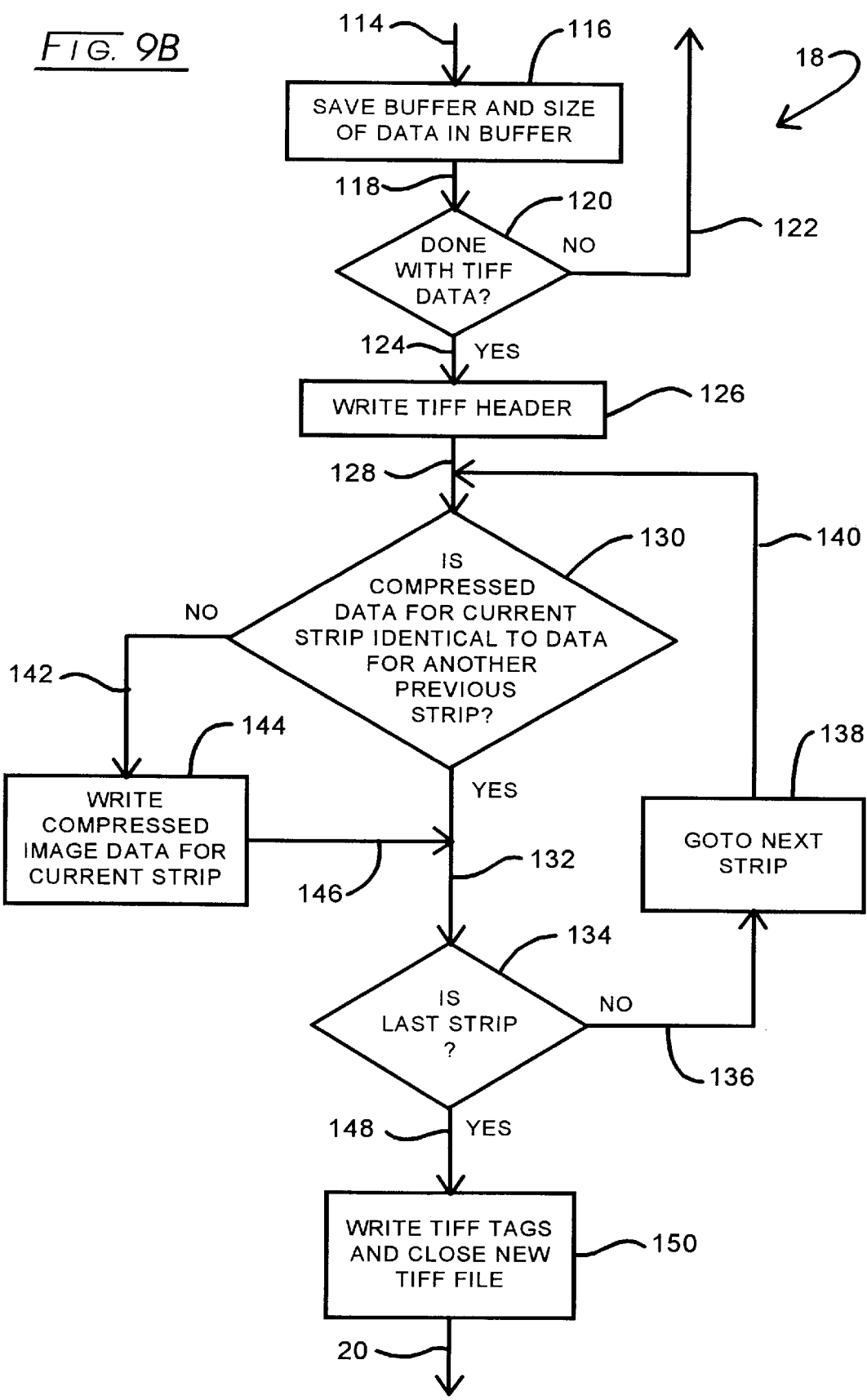

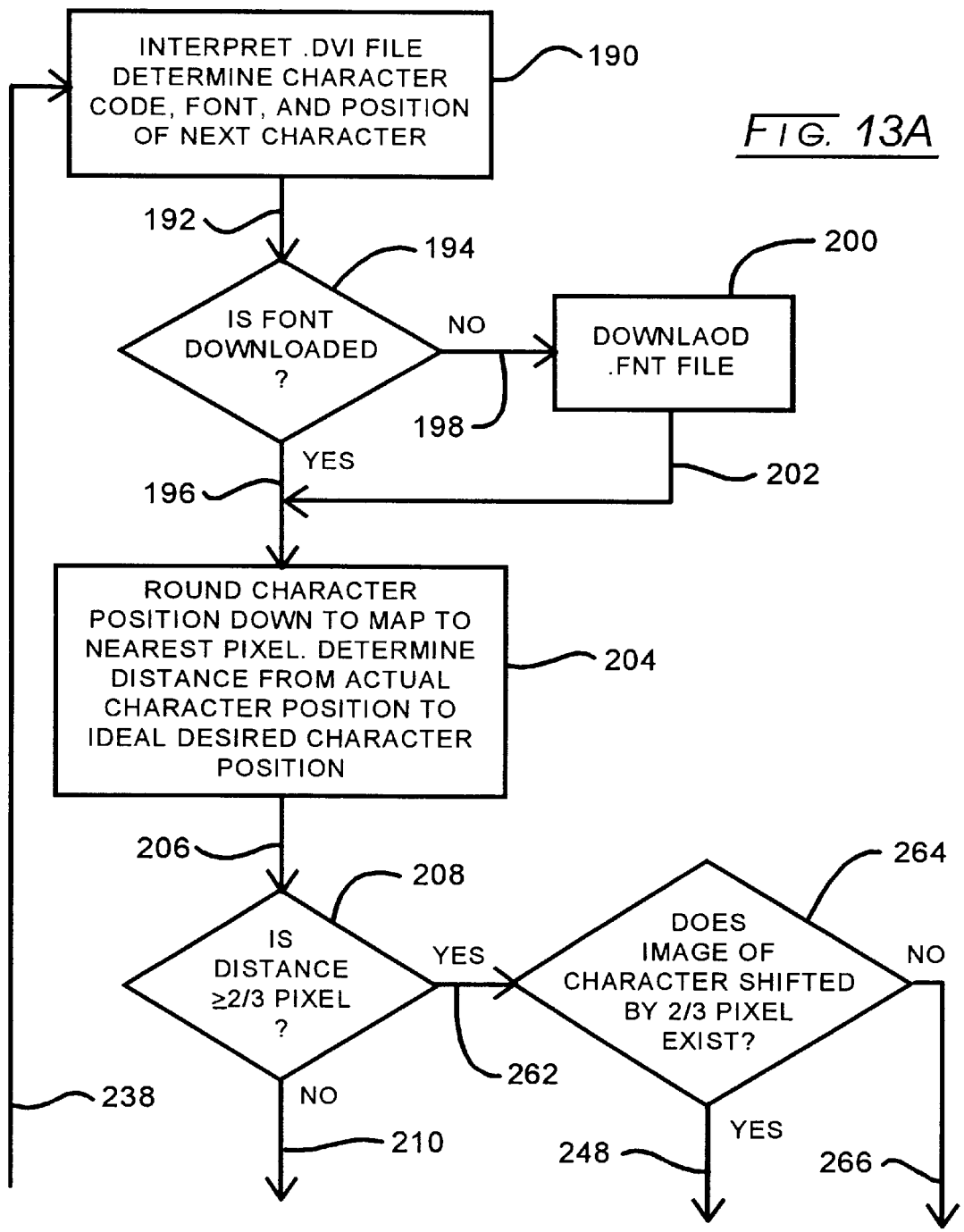

METHOD FOR DISPLAYING BITMAP DERIVED TEXT AT A DISPLAY HAVING LIMITED PIXEL-TO-PIXEL SPACING RESOLUTION

BACKGROUND

A communications system designed in the 1960s as part of preparation for surviving nuclear war evolved globally into what is now referred to as the "Internet". In effect, the Internet is a multitude of networks which interconnect to transfer information but without the supervision of an oversight organization. In 1989, a physicist at the European Particle Physics Laboratory known as CERN proposed a worldwide web (WWW), a set of protocols layered upon the Internet which utilize hypertext, a technique for presenting and relating information which uses links rather than linear sequences. The Web was demonstrated in 1991 and expanded rapidly with hypermedia and multimedia software. Developed in concert with the Web were a series of software interface programs structured to aid in navigating the Web which are called "browsers". In this regard, a team of programmers at the National Center for Supercomputing Applications (NCSA) developed a non-proprietary graphical interface browser for the Web which was released in 1993 under the name "Mosaic". Within six months of that release, more than two million people downloaded Mosaic from the NCSA host computer in Champaigne, Ill. The Mosaic browser is a cross-platform application, such that it is able to run in various different computing environments, i.e. PC-Windows, Macintosh, Amiga, and Unix-based systems. In the internet, for example, the Mosaic browser is deemed a "client"—an applications program running on a desktop computer and sending out requests for information typically to remotely located computer programs referred to as "servers". Within the Web, the client is responsible for displaying the information it receives from the server, and the server is responsible for performing the computation needed to retrieve the information the client is going to display, controlling access to that information, and recording usage statistics. The NCSA's Mosaic interface is a common one in use and when employed as an electronic publishing vehicle, its native HyperText Transfer Protocol (HTTP) (CERN, 1994a) is the protocol for communication with servers. Information itself is transmitted in HyperText Mark-up Language (HTML) which, in turn, is an application of the international (ISO, 1986) Standard Generalized Mark-up Language (SGML). Information transmitted in HTML is interpreted and displayed by the client as text and graphics on the user's screen or printer. See generally: Hickey, "Present and Future Capabilities of the Online Journal" *LIBRARY TRENDS*, vol. 43, No. 4, Spring, 1995, pp 528–543.

Several browsers are now available, for example Netscape Navigator has become widely used. More recently, a Web browser termed "Hot Java" has been developed by Sun Microsystems, Inc. using a language also developed by the Sun organization called "Java" which allow additional capabilities found desirable by database operators and developers seeking to serve internet clients. For example, code can be downloaded dynamically from the server to the user or client at the desktop level.

While the Web browsers have multi-platform capabilities, they have been constrained to use the text or character forming facilities of the individual platforms. Thus, there has been essentially no control available to the server for the final structuring of text and, particularly, the facilities from one platform to another are varied such that they do not have a commonality in techniques for painting characters upon a screen. This becomes a hindrance where scholarly text becomes the subject of Web distribution. For example, technical journals typically will incorporate glyphs or characters associated with mathematical equations and the like, for which platform-based character formations will have no counterparts. To overcome these difficulties, bit-map defined characters may be employed, preferably along with device independent typesetting specification files (DVI) which call for a particular character and font, and exactly define where the character should be positioned, for example, to the extent of $\frac{1}{64,000}$th of a point (a point is $\frac{1}{72}$nd of an inch). Such device independent files are described in U.S. Pat. No. 4,803,643, entitled "System and Method for Creating Memory-Retained, Formatted Pages of Text, Tabulation, and Graphic Data" by Hickey, issued Feb. 7, 1989. With such DVI systems, information can be transmitted to the client as to the proper position of the character at hand, its definition, and the like. However, because of the variety of facilities exhibited by various platforms to which the server transmits, the raster defined pixel matrixes by which characters are fashioned will vary and be unable to accommodate the precise DVI character positioning information. Typically, a given character is horizontally "relocated" to the closest available pixel on the screen or raster. In effect, a spatial character shift then becomes observable at a display with resultant text-character renditions which are disconcerting to the user. For example, characters of a given word may be bunched together or spread apart beyond their proper spacing definition. Particularly when viewed upon a dynamic screen or display, such spatial vagaries are quite disquieting. Generally, pixels in a display matrix are spaced apart between about $\frac{1}{70}$th and $\frac{1}{100}$th inch. While a displacement of that amount or only one half of that amount seems dismissable it will be very visible and distracting to the reader.

An approach in the field of computer graphics for improving image qualities, particularly with respect to "staircasing" or "jaggies" has been through resort to antialiasing which may employ any of a variety of sampling techniques to develop gray-scale variations in the definition of images. In effect, the human eye-neural system synthesizes the resultant gray-scale image and mentally interprets it as an improved sharper image. Such approaches to character display improvement were undertaken by investigators at about the time of the introduction of the personal computer. See, for example:

1. Negroponte, N., SoftFonts. Proceeding, Society for Information Display, 1980
2. Schmandt, C., Fuzzy Forms: Analog Models Inprove Digital Text Quality, Conference of Exhibition of the National Computer Graphics Association (4th, 1983)
3. Schmandt, C. Soft Typography, Information Processing '80. Proceedings of IFIPS, pp.1027–1032
4. Wilkes, A. J. and Wiseman, N. E., A Soft-edged Character Set and Its Derivation, The Computer Journal, vol. 25, No. 1, pp 140–145 (1982)

Anti-aliased image generation also is undertaken with varying hues or colors. See in this regard:

5. Schmandt, C., Greyscale Fonts Designedfrom Video Signal Analysis, Architecture Machine Group, Massachusetts Institute of Technology
6. Gupta, S., Bantz, D., Sholtz, P., Evangelisti., C., and DeOrazio, W., YODA: An Advanced Display for Personal Computers, IBM J. Res. Develop., vol. 31, No. 1, pp 44–57 (Jan. 1987)

While the anti-aliasing approach to character generation has served the purpose of presenting relatively higher quality characters on limited resolution displays, the need to achieve a form of sub-pixel positioning on a practical basis has persisted. In effect, the high resolution typesetting specifications do not translate into integer values at low resolution. Thus, the noted character positioning aberrations. Investigators have addressed this anomaly by looking to an approach carrying out a sub-pixel shifting utilizing a gray scale filtering process. See in this regard:

7. Warnock, J. E., The Display of Characters Using Gray Level Sample Arrays, Comput. Graph. 14, No. 3, 302–307 (July 1980)
8. *Computer Graphics, Principles and Practice*, 2d Ed., pp 976–979, Addison-Wesley Co., Inc. (1990)

Filter derived sub-pixel positions or locations, sometimes called "phases", however, pose the problem of requiring immense amounts of storage and computational constraints which have remained unsolved. As the Internet system expands, however, an increasing demand follows for the an improved accessing and display of scholarly works. A technique for the practical generation of such materials at lower level resolution displays has heretofore proved to be an elusive goal.

SUMMARY

The present invention is addressed to a method for generating bitmap-described text in conjunction with typeset specifications at displays exhibiting limited pixel-to-pixel resolution. While display character positioning is developed by rounding off to a nearest pixel location of such limited resolution displays, sub-pixel positioning is developed in conjunction with anti-aliased filtering to achieve improved character-tocharacter positioning and readability. These features are realized both with computational practicality and with acceptable storage requirements. The method has particular application to the delivery of scholarly text via the internet from server to client software and may be employed with web browsers such as the earlier-noted "Hot Java".

To achieve its practicality, the methodology initially creates an image font file (.FNT) for utilization by a server in conjunction with a device independent typesetting specification and the text to be displayed. The image font file includes font data wherein each character thereof is provided as a compressed character image template produced with respect to a font size representing an expanded version of the size which ultimately may be displayed.

Upon being accessed by client software at a platform, typically having a diplay of limited pixel-to-pixel spacing resolution, the extent of character position error is determined with respect to the proper position specified by the device independent typesetting file. Then, utilizing the compressed character image template data, a display character is formed, as it were, "on the fly" at requisite font size with sub-pixel positioning or phasing where required. This is achieved with an efficient shifting and filtering procedure developing the display characters in desirable anti-aliased format.

The invention further features a method for generating typeset characterized text, at a platform display exhibiting limited pixel-to-pixel spacing resolution, the text having a predetermined font of characters of select pixel defmed font type and font size, and the text being conveyed from a server to client software at the above platform, comprising the steps of:

1. providing an image font file as a compressed bitmap representation of each of the characters of the font, derived as a compressed character image template corresponding with a font size representing an expansion factor, F, based scaling of the predetermined font select size;

2. providing a device independent typesetting specification file for the text and the predetermined font of characters representing the ideal location of each character of the text at a display;

3. conveying the image font file and the typesetting specification file to the client software; and 4. at the platform:
   (a) determining from the typesetting specification file and the given pixel matrix resolution, the positional error with respect to the ideal location for each character of the text when located at the nearest pixel available at the display,
   (b) determining for a text character whether the error is greater than a predetermined portion of the pixel-to-pixel spacing,
   (c) accessing the image font file for the compressed character image template corresponding with the text character,
   (d) shifting the compressed character image template in a predetermined direction an amount representing at least one pixel when the determination (b) is that the error is greater than the predetermined portion of the spacing,
   (e) filtering and scaling the character image template to derive an anti-aliased display character at the select font size,
   (f) displaying the display character at the platform display, and
   (g) reiterating steps (a)–(f) for characters of the text.

In still another feature of the invention, a method is provided for generating typeset characterized text, at a platform display exhibiting limited pixel-to-pixel spacing resolution, the text having a predetermined font of characters of selected pixel defined font type and font size, and the text being conveyed from a server to a client software at the platform, comprising the steps of:

1. providing an image font file as a compressed bitmap representation of each of the characters of the font, derived as a compressed character image template corresponding with a font size representing an expansion factor, F, based scaling of the predetermined font select size;

2. providing a device independent typesetting specification file for the text and the predetermined font of characters representing the ideal location of each character of the text at a display;

3. conveying the image font file and the typesetting specification file to the client software; and 4. at the platform:
   (a) determining from the typesetting specification file and the given pixel matrix resolution the positional error with respect to the ideal location for a character of the text when located at the nearest pixel available at the display,
   (b) determining for the character of the text whether the error is greater than a predetermined portion of the pixel-to-pixel spacing resolution,
   (c) when the error is determined to be greater than the predetermined portion of the pixel-to-pixel spacing resolution, then determining whether an anti-aliased display character has been generated in accordance with step (g) hereof and cached in temporary memory and, in the event that it has been cached, then going to step (i) hereof, (d) when the display character has not been cached, accessing the image font file for the compressed character image template corresponding with the character of the text, (e) decompressing the accessed compressed character image template to an extent identifying character image transitions from relative black and white runs of pixels, (f) when the error is determined to be greater than the predetermined portion of the pixel-to-pixel spacing, carrying out an effective shifting of a predetermined number of pixel positions in a predetermined horizontal direction at the decompressed character image template, to derive a shifted character image template, (g) then filtering and scaling the shifted character image template to produce an anti-alias display character of the select font size, (h) caching the anti-aliased display character in temporary memory, (i) displaying the display character at the platform display, and (j) reiterating steps (a)–(i) for characters of the text.

Other objects of the invention will, in part, be obvious and will, in part, appear hereinafter. The invention, accordingly, comprises the system and method possessing the construction, combination of elements, arrangement of parts and steps which are exemplified in the following detailed disclosure.

For a fuller understanding of the nature and objects of the invention, reference should be had to the following detailed description taken in connection with the accompanying drawings.

BRIEF DESCRIPTION OF THE DRAWINGS

FIG. 1 is a photograph of platform display text showing anti-aliased characters without sub-pixel positioning;

FIG. 2 is a photograph of the display of FIG. 1 showing the same text with anti-aliased characters incorporating sub-pixel positioning and generated in accordance with the method of the invention;

FIG. 3A is a photograph illustrating three enlarged words from FIG. 1;

FIG. 3B is a photograph illustrating the same three words in enlarged fashion from FIG. 2;

FIGS. 9A and 9B combine to provide a flow chart illustrating the third step set forth in FIG. 4;

FIGS. 13A and 13B combine to provide a flow chart describing the carrying out of the display of image fonts at client software of a platform in accordance with the method of the invention;

DETAILED DESCRIPTION

Figure 4:
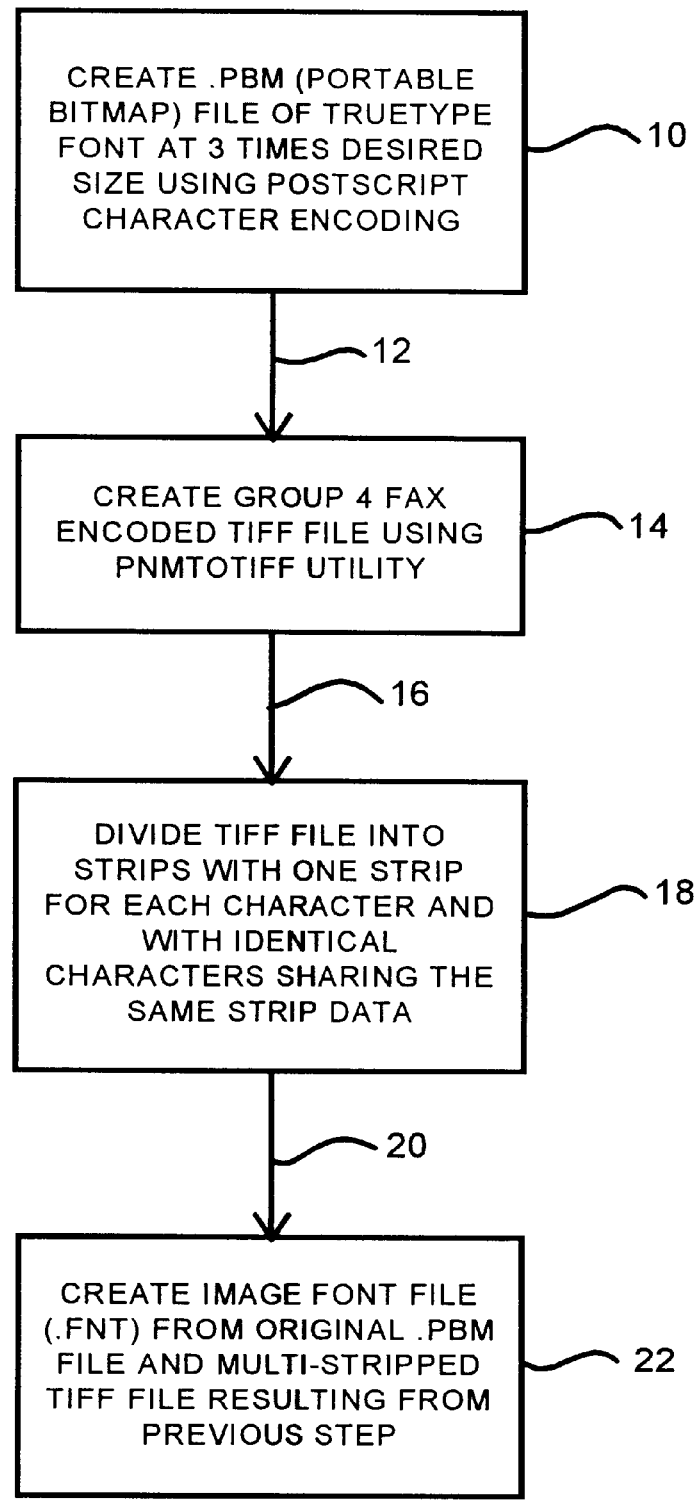
FIG. 4 is a flow chart illustrating the generation of an image font file in accordance with one aspect of the invention.

In achieving a practical generation of characters and their combination as words under the constraints of rigid typesetting criteria with acceptable character-to-character spacing, the present method employs the gray-scale based anti-aliasing techniques of computer graphics. Where primitive character structures are generated at pixel-based display screen arrays, they have jagged edges, an undesirable effect referred to as staircasing or the jaggies. This is an instance of a phenomenon known as aliasing. By utilizing one or more of a variety of filtering techniques, characters may be reconstituted in gray-scale to produce an image output which, when viewed at a computer driven display, may be interpreted by human retinal-neural cognition factors as a relatively smoothly defined image. Under the method of the present invention, such filtering is carried out in both horizontal and vertical directions. However, sub-pixel positioning or phasing procedures also are performed, but in a singular horizontal direction, in order to prevent excessive memory stage requirements.

Referring to FIG. 1, a reproduction from a personal computer display is provided with a paragraph of information. The ouput represented by that paragraph has been subjected to an anti-aliasing procedure in accordance with the invention but without sub-pixel spacing or phasing. When displayed at a conventional personal computer raster display and at a normal viewing distance, the individual characters within the formation shown at FIG. 1 will appear to be relatively normal, not being characterized by jaggies or the like. However, because the character placement has been attempted under the stringent dictates of a typesetting specification (DVI) and because of the limited resolution of the display at which they appear, they will be positioned in the above-described rounded off manner, i.e. to the nearest available pixel location. The result is either a disconcerting spreading apart of adjacent characters within a word or, conversely, a bunching of them together. For example, in FIG. 1, the gray-scale based image of the word "information" shows a bunching together of the adjacent characters a and t. Similarly, the adjacent characters n and f are bunched together. On the other hand, the characters r and m are spaced excessively apart. The word "things" on the second line shows a bunching together of the characters i and n as well as g and s. In the next line, the word "accepted" shows a bunching together of the adjacent characters c as well as the adjacently disposed characters p and t. The fifth line of the paragraph shows the word "scientific" as being formed with bunched together i's and f characters. While the character positioning anomalies are present in the paragraph of FIG. 1, the utilization of filtering to achieve anti-aliasing has indicated that adequate individual characters may be formed.

Looking by comparison to FIG. 2, the same paragraph of information as presented in FIG. 1 is set forth, however, with phasing or sub-pixel positioning of characters. This is achieved without excessive memory requirements and with minimal increase in computational expense. Note that the characters forming the word "information" appear to be properly spaced. Similarly, the characters of the word "things" appear to be properly spaced. Looking momentarily to FIG. 3A, an enlargement is made of the word "things" as presented in FIG. 1. As noted above, the characters i and n are bunched together as well as the characters g and s. By comparison, looking to the same word in FIG. 3B from FIG. 2, that aberrant spacing is corrected with sub-pixel positioning generated on a practical basis. In similar fashion, the word "accepted" appears in FIG. 2 with apparent correct character spacing. As seen in FIG. 3A, the word is presented as it appears in FIG. 1 with a bunching together of the characters c as well as p and t and e and d. As viewed in FIG. 3B, with sub-pixel positioning using the technique of the invention, the word appears appropriate and readable without distraction. Looking again to FIG. 3A, the word "scientific" as seen in FIG. 1 is represented in enlarged form. When corrected in conjunction with sub-pixel spacing as seen in FIG. 3B, the characters i and f appear to be properly spaced.

In general, the method of the invention looks to the generation of typeset characterized text at the display of a platform or personal computer which typically will exhibit limited pixel-to-pixel spacing resolution. The typeset characterized text is text which has been developed in conjunction with a typesetting specification or .DVI file having rather tight spatial positioning tolerances, for example to a resolution of one in 64000.

In accordance with the invention, produced for storage in a server system is a file referred to as an "image font file" (.FNT). This file is created to carry a compressed bitmap representation of all of the characters of one or more fonts utilized with a given text. The same form of data is provided for symbols which are considered to be subsumed herein under the general term "character'(s)". Each such compressed bitmap representation will be derived as a character image template corresponding with a font size which is enlarged with respect to that of the text size, such enlargement being represented by an expansion factor F.

Also retained at the server system with the image font file is a device independent typesetting file. This file will include the noted typesetting specification file for the text at hand as well as font type and font size data for the text. Further, the text itself will be present as a portion of this independent file. At the behest of a client browser, for example "Hot Java", the above files are downloaded to the client at a remote platform.

Client software at the platform, performing "on the fly", determines character positional error from the conveyed data and then creates an appropriate character image from the compressed character image template corresponding with any given text character. This will involve filtering and sub-pixel positioning. However, such operations take place with respect to the compressed image as opposed to a complete bitmap presentation for the character. This gready reduces computational expense as well as avoids the impractical memory requirements otherwise encountered with conventional font storage techniques.

With the above synopsis of the instant method in mind, reference is made to FIG. 4, describing the creation of an image font file (.FNT). Development of this file involves the creation of a compressed bitmap.representation of each character of the fonts which will be contained in the file. Each of these characters is derived as a compressed character image template which corresponds with or represents a font size typically larger than that ultimately to be displayed. In this regard, that compressed character image template will represent a font size at the expansion factor, F. This factor, for convenience, and as a preferred embodiment, is represented by the number "3" in the discourse to follow. However, it may be varied with respect to the desires of the creators of the image font file.

In the figure, for a given set of text data, as represented at block 10, a portable bitmap file (.PBM) of a desired font is created. In block 10, the selected font type is one of a compilation identified as a "True Type" font. For different portions of the text, other font types may be employed and, as noted above, for scholarly works, the bitmap may include arithmetic or chemical symbols or glyphs. As noted in block 10, this bitmap file of the selected font is provided at a selected expansion factor, F, here given the value, 3. For example, should a 12 point font size ultimately be desired, then the method would look to a 36 point font size for the instant step. However, as discussed later herein, a form of "zooming" may be developed using a different sizing or scaling factor.

Figure 5:
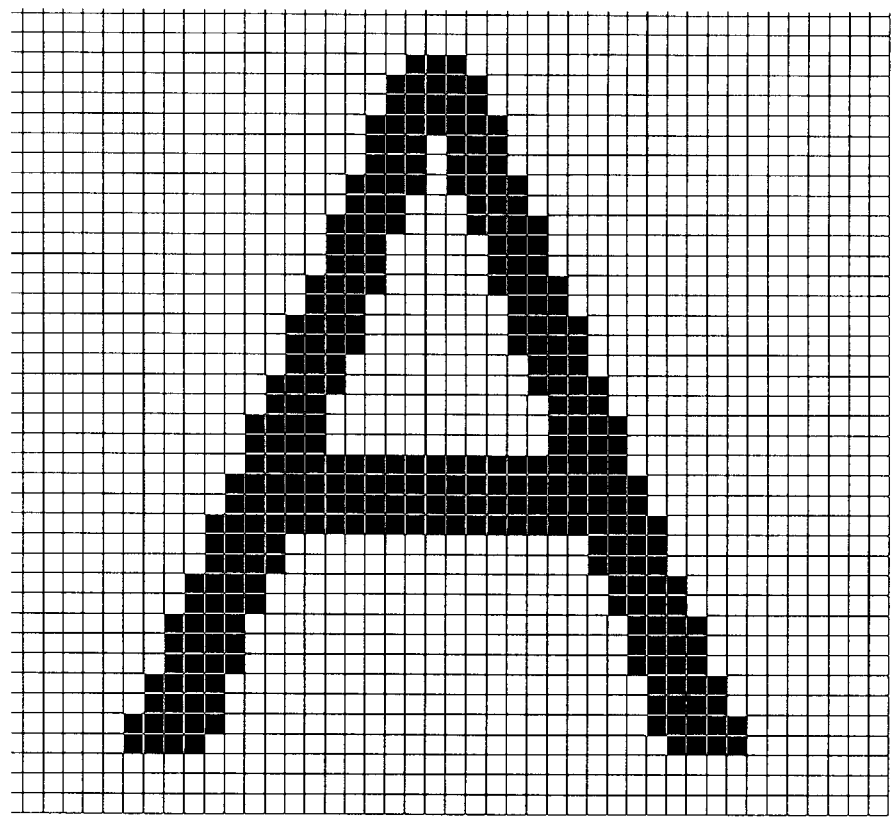
FIG. 5 is a representation showing a 12 point Helvetica character in a magnified rendition of a bitmap at three times normal size.
Figure 6:
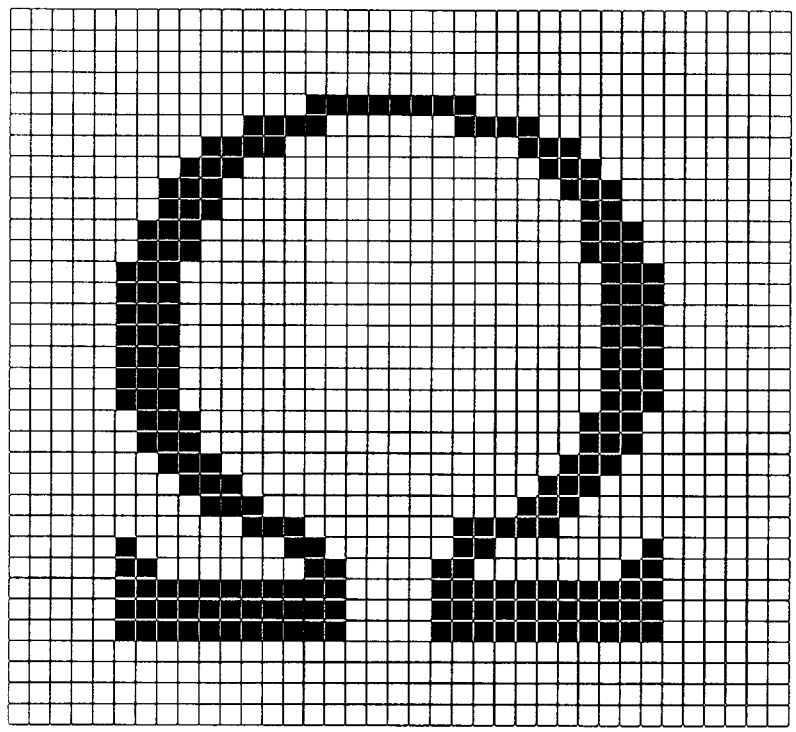
FIG. 6 is a representation showing a 12 point Helvetica character symbol in a magnified rendition of a bitmap at three times normal size.

Looking momentarily to FIGS. 5 and 6, an enlarged 12 point rendition of the character, A, is presented. In the figure, the darkened squares represent pixel locations for this enlarged character. A stairstepping effect with respect to diagonal components of the thus represented character become apparent. The font family for this magnified character version is Helvetica. Note that the bitmap rendition of the character at three times normal size represents a scaling both in the vertical and horizontal directions.

Referring additionally to FIG. 6, a bitmap redition is represented at three times normal size for a 12 point symbol character. Here, the symbol is shown as an omega.

Returning to block 10 at FIG. 4, these font family character and symbol renditions are developed with respect to the noted expansion factor, F (here three times) using Postscript character encoding or identification. Postscript® is a registered trademark of Adobe Systems, Inc.

As represented by line 12, this preliminary portion of the method then commences to carry out the procedures represented at block 14. In this regard, the .PBM file developed in connection with block 10 is compressed by the creation of a Group 4 fax encoded TIFF file (tag image file format). This is carried out through the utilization of a pnmtotiff utility. Such compression greatly reduces the amount of data otherwise represented by a bitmap representation of a given character as expanded by the noted expansion factor. In effect, the compression identifies the transitions between what may be relatively considered black and white pixel positions within the bitmap. A variety of compression schemes. have been developed in the industry. Generally, they employ such approaches as identifying a horizontal run of pixel positions. For instance, a run having a length of 20 would be identified as the number 20 and adjacent row of three black positions would be identified as the number 3. The next horizontal row typically will be identified only by the difference between it and the next preceeding row. Further compression can be carried out with Huffman encoding procedures generally referred to as Group 3 fax encoding. Produced by the combination of procedures represented at blocks 10 and 14 then is what, in effect, is a very narrow strip of compressed bitmap related data representing the expanded character fonts associated with a given text. Next, as represented by the arrow 16 and block 18, the TIFF file is divided into strips with one strip for each character. Again to conserve the amount of data required, where characters are identical, the same strip data is shared. This is accomplished, for example, with the use of a pointer as opposed to supplying a separate strip of data. Next, as represented at line 20 and block 22 provision is made for the creation of an image font file (.FNT) from the original .PBM file and multi-stripped TIFF file as developed in conjunction with block 18. Basically, this procedure serves to extract a few pieces of information from the characters of the fonts such as how many bits tall the character is; how many bits wide the character is; and the distance from the top of the character down to where the baseline is. For example, for such characters as g, there is a descender and baseline line-ups are called for. It should be borne in mind that there still is created at this juncture a character image template corresponding with a font size representing the noted expansion factor which, for the instant example, provides for a scaling of the desired font size by a factor of 3. However, the data is in a compressed state. This image font file (.FNT) is transmitted or conveyed from a server in conjunction with a device independent type setting specification file (DVI) for the text and the font or fonts of characters, the DVI file representing the ideal location of each character of the text when displayed. It may be observed that no collection of fonts with varying sub-pixel architectures are developed with the method.

Figure 7:
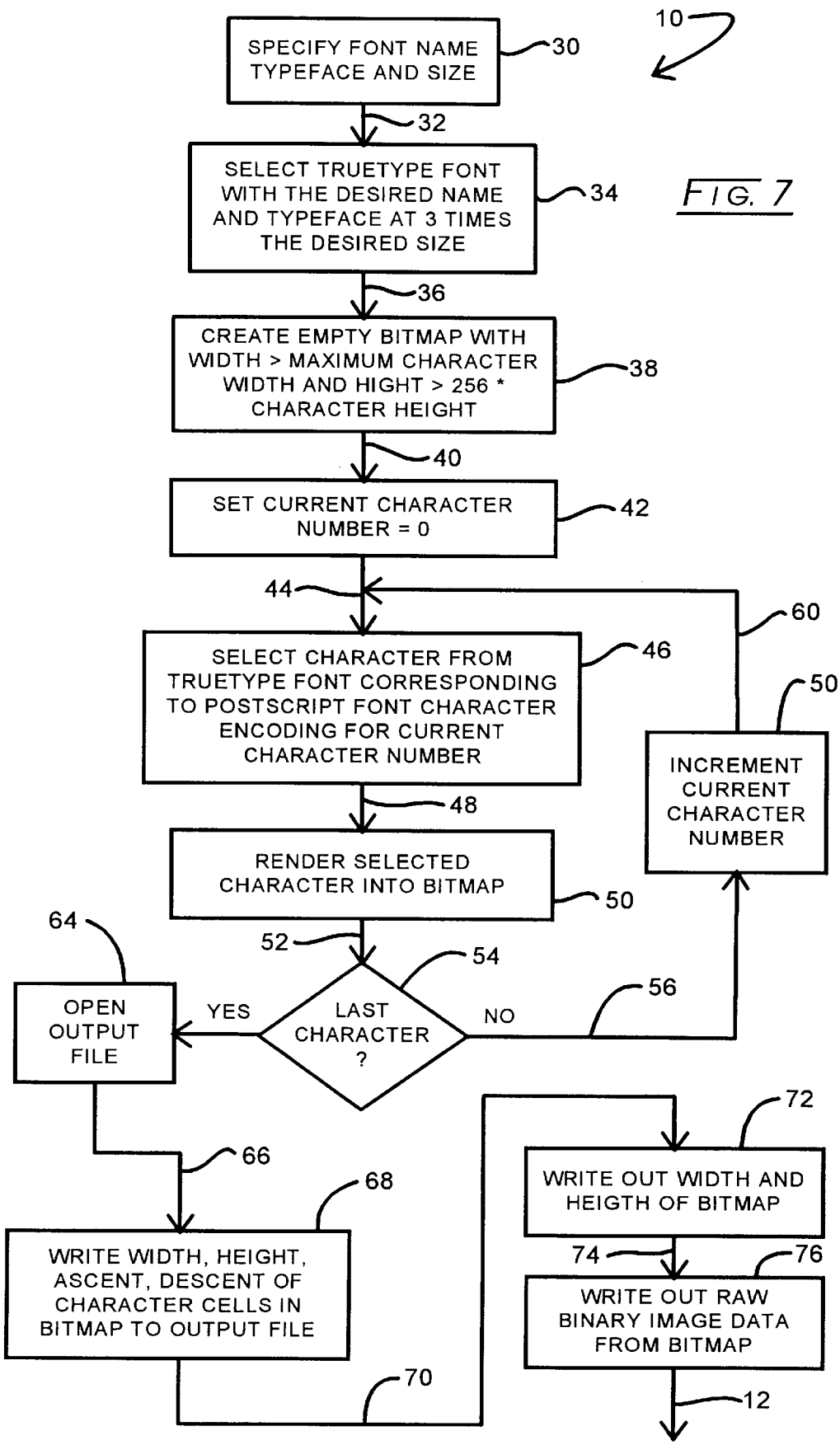
FIG. 7 is a flow chart of the initial step described in conjunction with FIG. 4.

Turning to FIG. 7, the procedures discussed generally in connection with block 10 are elaborated upon and identified in general again at 10. This initial step in the procedure is seen to commence at block 30 calling for the specifying of the font name, typeface and size. For example, of the TrueType fonts, Helvetica or Times Roman may be selected with a bold designation. Accordingly, upon specifying the font, as represented at line 32 in block 34, the TrueType font of the desired family designation is selected as well as the specified typeface. However, this selection is at an expansion factor, F, over the desired font size. Here, as an example, a scale of three times both in vertical and horizontal directions is elected. Selection of the expansion factor, F, will be concerned with character printability and the opportunity for varying character size with a form of zooming at later stages of the process. With the noted selections, then as represented at line 36 and block 38, the program proceeds to create an empty bitmap. Note in this regard that the width is greater than the maximum width of a character of the font and the height is greater than 256 times the character height. Thus, the empty bitmap has the characteristics of being tall and narrow. In general, the characters of a given font will not exceed 256 in number. Next, as represented at line 40 and block 42 the current character number is set at 0 and, as represented by line 44, the portable bitmap commences to be created. As set forth at block 46, characters are selected from the TrueType font as identified by the Postscript® font character encoding. That encoding is associated with a current character number. The program then continues as represented at line 48, with the expansion factor scaled character selected being rendered into the tall and narrow bitmap. Then, as represented at line 52 and block 54, a query is posed as to whether the last character of the font has been rendered into the bitmap. In the event that it has not, then as represented at line 56 and block 58, the current character number is incremented and the program loops as represented at lines 60 and 44 to select the next character of the font. Where all of the characters for the present font have been selected, as represented at line 62 and block 64, an output file is opened on the disk being written to. Then, as represented at line 66 and block 68, the width, height, ascent and descent of the character cells in the bitmap are written to the output file. Because the anti-aliasing and phasing or sub-pixel positioning of the characters will be seen to be carried out in conjunction with a compressed version of the character data, this information is required for utilization in conjunction with the typesetting specification or DVI file to be employed at the client software associated with a given platform. Next, as represented at line 70 and block 72, the width and height of the entire bitmap are written out. The portable bitmap (.PBM) then is completed as represented at line 74 and block 76 with the writing out of raw binary image data from the bitmap. The program then continues both as represented at line 12 in FIG. 4 and as represented by the same numeration in the instant figure.

Figure 8:
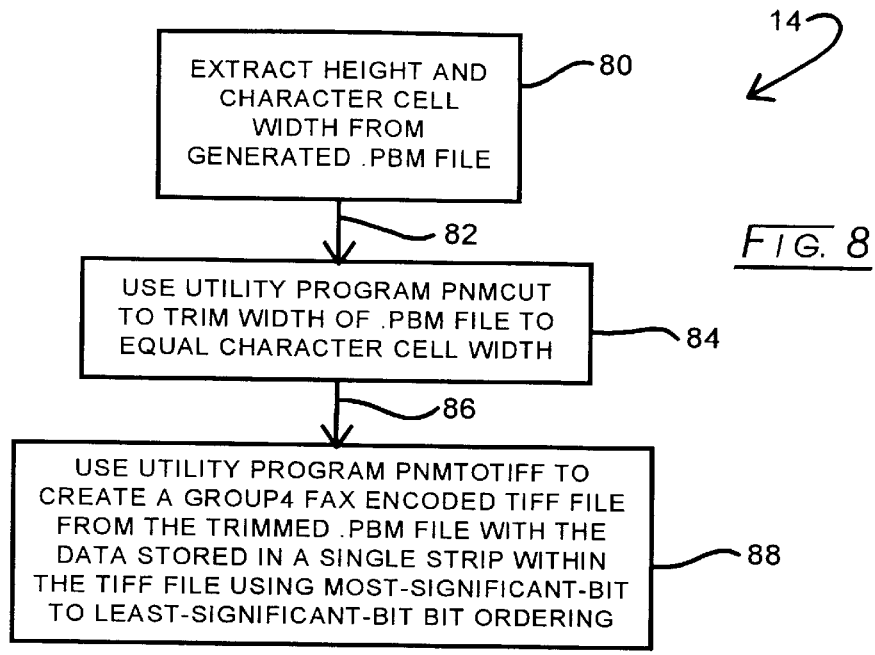
FIG. 8 is a flow chart illustrating the second step described in conjunction with FIG. 4.

Turning to FIG. 8, the subject matter discussed in connection with block 14 in FIG. 4 is represented at an enhanced level of detail and again is shown generally at 14. The initial instruction for this step in the procedure is represented at block 80 and provides for the extraction of character cell heights and widths from the earlier generated .PBM file. This is to permit a subsequent trimming of the width of the file, inasmuch as the earlier developed bitmap is required to be of a width representing a multiple of a particular number of pixels, for example 16. The objective with this information is to eliminate excessive "white" space. Accordingly, as represented at line 82 and block 84, the utility program, pnmcut is employed to trim the width of the .PBM file to equal a character cell width. Then, as represented at line 86 and block 88, the pnmtotiff utility program is utilized to create a Group 4 fax encoded TIFF file from the tmmed PBM file. The transition based data is stored in a single strip within the TIFF file using most significant bit to least significant bit ordering. In this regard, the pixels can be ordered from the leftmost bit or from the rightmost bit, a selection being available from two conventions or characteristics. This selects the desired convention. In effect, the procedure represented at 14 takes the .PBM file and translates it to a TIFF file using certain characteristics as noted above. Generally, the TIFF file will include several different tags, for example, identifying how tall the image is; how wide the image is; how many strips of actual data are present; and how many rows of data are in a strip.

Figure 9A:
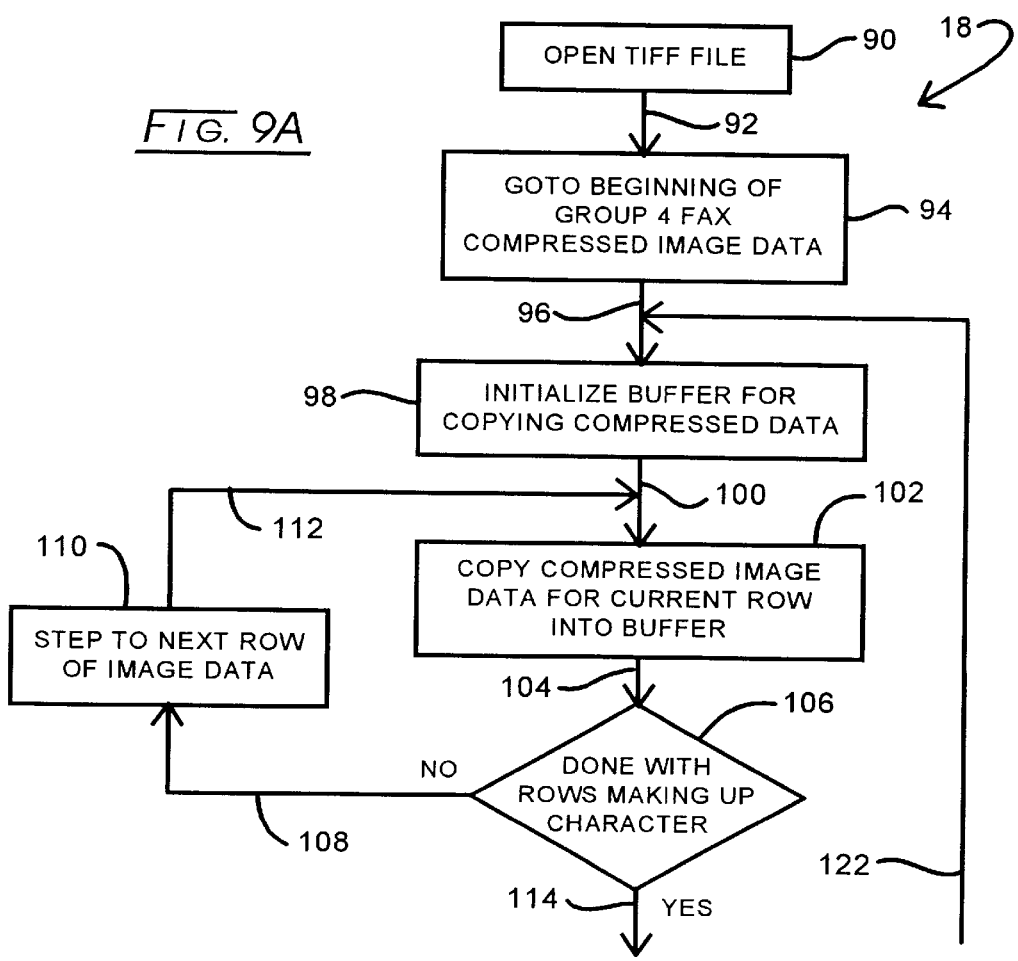

FIGS. 9A and 9B combine to elaborate upon the step described in conjunction with block 18 in FIG. 4, such numeration appearing as a general designation in connection with these figures. Looking to FIG. 9A, block 90 provides for the opening of the above created TIFF file. Then, as represented at line 92 and block 94, the program looks to a pointer indicating where the data for the image begins, i.e. at the beginning of the Group 4 fax compressed image data. Then, as represented at line 96 and block 98, a buffer is initialized for copying compressed data. Next, as represented at line 100 and block 102, the compressed image data for a current row of the character is copied into buffer. The program then continues as represented line 104 to the query posed at block 106 determining whether or not all the rows making up the characters have all been copied. In the event they have not, then as represented at line 108 and block 110, the program steps to the next row of image data and, as represented at lines 112 and 100, this component of the program loops until all rows of data corresponding to a single character have been copied into the buffer.

The program then continues as represented at line 114 and FIG. 9B to block 116 wherein all of the data for a character is stored in a separate buffer. As represented at line 118 and block 120, a query is made as to whether all of the TIFF data has been stored. In this regard, all of the characters of all of the fonts involved are so stored. Accordingly, in the event of a negative determination that all of the characters are not stored, then as represented at line 122 extending to FIG. 9A and line 96, the procedure continues until all of the data for each character is stored Returning to FIG. 9B, where the characters for the entire TIFF file are stored, then as represented at line 124 and block 126, a header is written to the TIFF file to define it as being such a TIFF file. Then, as represented at line 128 and block 130, a query is made as to whether the compressed data for a current strip is identical to data for another previous strip. Because a buffer is provided for each of the characters, the program thus is capable of looking at each of the strips and determining whether it is identical to any other. If it is exactly the same, instead of writing out the same data again, the system merely points to the previous data This procedure continues as represented at line 132 and block 134 through each of the strips. Accordingly, where the last strip has not yet been encountered, as represented at line 136 and block 138 the next strip is accessed and, as represented at lines 140 and 128 the routine continues in looping fashion. Where the query at block 130 determines that a current strip is not identical to data for a previous strip, then as represented at line 142 and block 144, the compressed image data for the current strip is written and the routine continues as represented at lines 146 and 132.

Where the last strip is encountered, then the query posed at block 134 will result in an affirmative determination and as represented at line 148 and block 150, TIFF tags are written and the new TIFF file is closed. These tags will include identifiers of height, width, where within the file each of the strips begin and how many bytes long each of the strips are. The program then continues as described in conjunction with line 20 in FIG. 4 and as represented in FIG. 9B by a line with the same identifying numeration.

Figure 10:
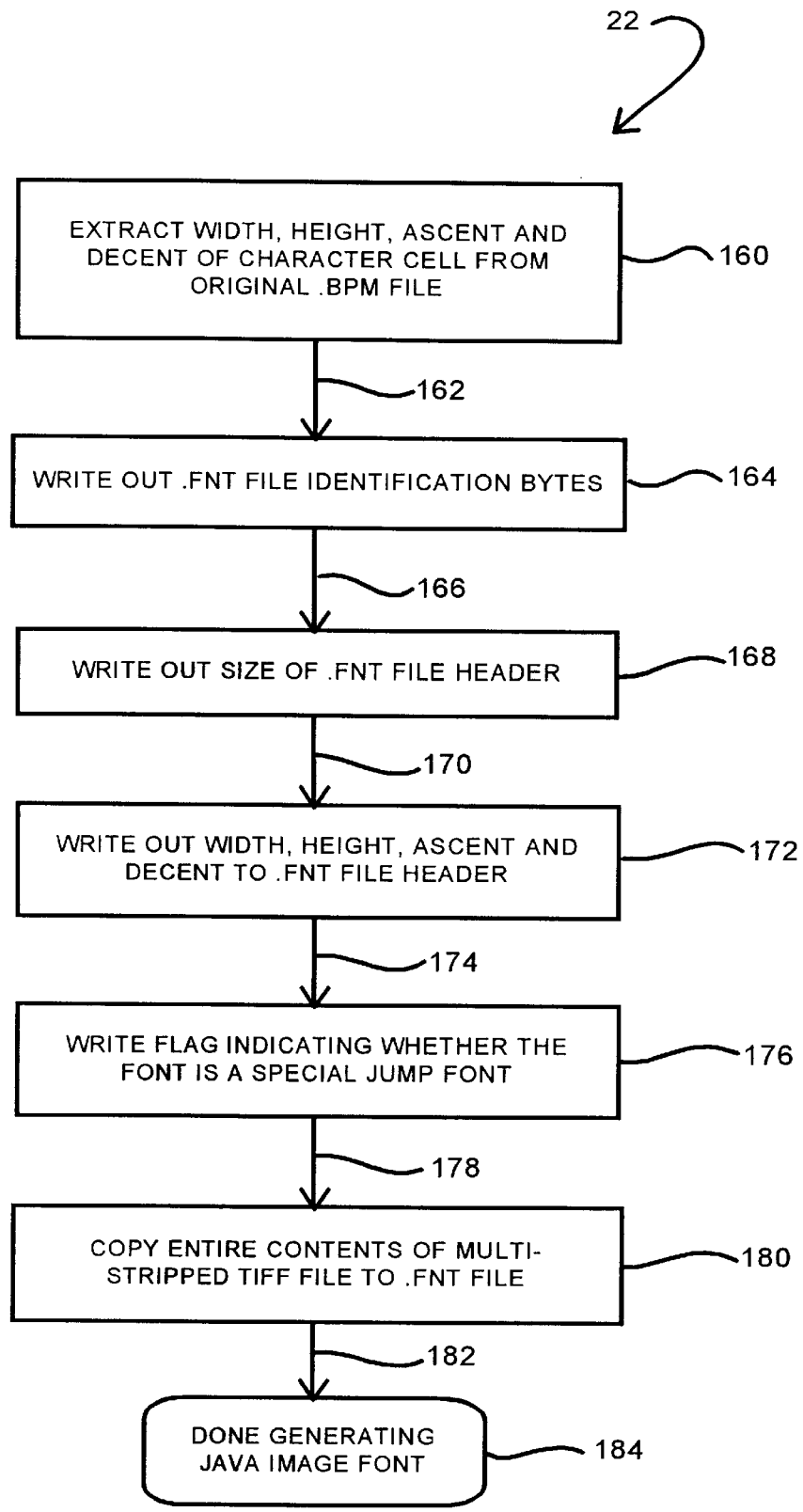
FIG. 10 is a flow chart illustrating the fourth step shown in FIG. 4.

The fourth step in creating an image font file as described at block 22 in FIG. 4, is illustrated at an enhanced level of detail in FIG. 10. Referring to FIG. 10, that fourth step in the procedure for generating an image font file is shown with the same general numeration 22. This fourth component of the procedure commences as represented at block 160 where an extraction is made of the width, height, ascent and descent of the character cell from the original .PBM file. Then, as represented at line 162 and block 164, the .FNT file identification bits are written out. This identifies the file as a .FNT file. Next, as represented at line 166 and block 168, the size of the . FNT file header is written out. This is a number of bytes, for example 10, along the header. In general, this font file consists of merely a small header and the TIFF file completed at the third step described at 18 and in conjunction with FIGS. 9A and 9B. Next, as represented at line 170 and block 172. The width, height, ascent and descent are written out to the .FNT file header. Next, as represented at line 174 and block 176 a flag is written where called for indicating whether the font is a special jump font. This is a font which would be employed for the purpose of highlighting a hypertext link, for example, in a different color. From block 176, as represented at line 178 and block 180, the entire contents of the multi-strip TIFF file are copied to the font (.FNT) file. Then, as represented at line 182 and node 184, the image font file is completed. This image font file will be conveyed or transmitted accompanied with the typesetting specification file (DVI) which also will contain the text to be conveyed to client browser software at a given platform that requests it from a server. Note that each character data compilation is present as a compressed character image template and at a size corresponding with the expansion factor, F, here shown as having a value of 3. The client software or browser then performs an anti-aliasing, phasing and scaling methodology on an "as required" basis with respect to each character and its position as defined by the typesetting specification file (DVI). For the instant demonstration, three possible character images may be generated with respect to each compressed character image template. Depending upon the pixel-to-pixel spacing error determined, the display character created from the compressed character image template will represent, in effect, an expanded character which has been submitted to an anti-aliasing filtering and scaling function or that expanded character effectively shifted by one pixel to the right and then subjected to anti-aliasing filtering and scaling, or that expanded character shifted two pixels horizontally to the right and subjected to anti-alias filtering and scaling. It should be borne in mind that the data operated upon for this procedure is compressed data. Also, while scaling is carried out in both horizontal and vertical directions, sub-pixel positioning is generated only in a horizontal direction and in a convention, for example, from left to right as observed by the display viewer. While a similar vertical phasing procedure might be carried out, that would involve altering the amount of computation and potential storage from the possible three character images now generated to a potential nine character images, representing an exponentially elevated computational and storage investment. It has been observed that the utilization of only horizontal sub-pixel positioning achieves a character and symbol image quality acceptable to the typical viewer. The filtering procedure carrying out anti-aliasing of the characters will, for example, generate characters having a potential of 16 gray-scale variations of pixel brightness.

Figure 11A:
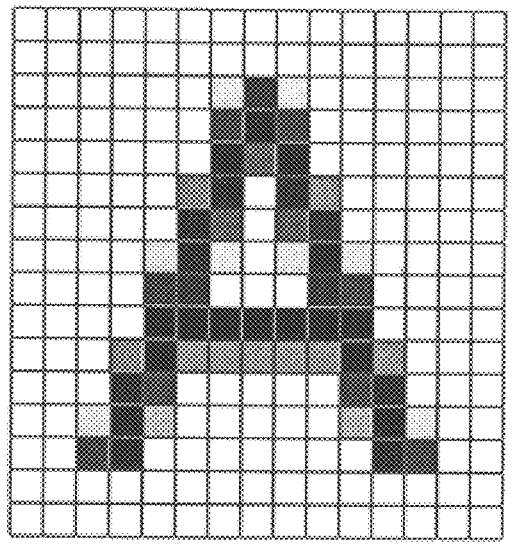
FIG. 11A is a photograph of a 12 point Helvetica character corresponding with FIG. 5 scaled down by a factor of 3 and filtered to produce an anti-aliased gray-scale bitmap of the character.
Figure 11B:
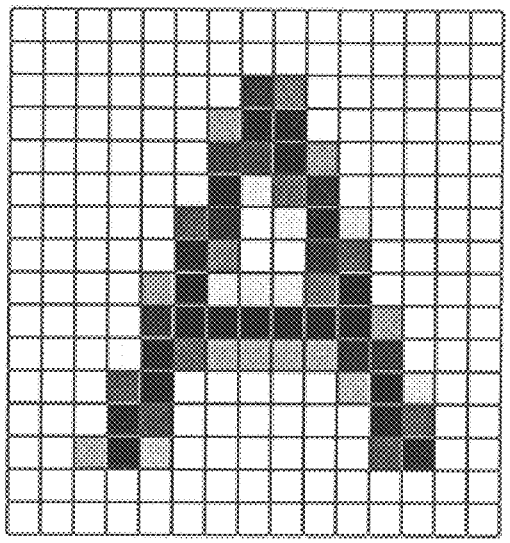
FIG. 11B is a photograph of a 12 point Helvetica character as represented in FIG. 5, shifted rightwardly by one pixel, scaled down by a factor of 3 and filtered to produce an anti-aliased gray-scale bitmap of the character shifted right by one-third of a pixel-to-pixel spacing.

The end result of the filtering and scaling technique, as opposed to the method of generating characters, may be observed in connection with a comparison of the enlarged character shown in FIG. 5 when converted to the scaled down 12 point Helvetica character which additionally has been filtered to evolve a gray-scale (anti-aliased) image. FIG. 11A shows such a scaled image in magnified form with no sub-pixel positioning adjustment. FIG. 11B shows the same character with a 1 pixel shift carried out upon the compressed character image template version of FIG. 5 in a rightward sense as viewed by the reader and having been scaled down by a factor of 3 while being filtered to produce an anti-aliased gray-scale image shown. That image, when viewed at a display, will be observed by the viewer to have been shifted rightward to an extent representing about one-third of the display pixel-to-pixel spacing.

Figure 11C:
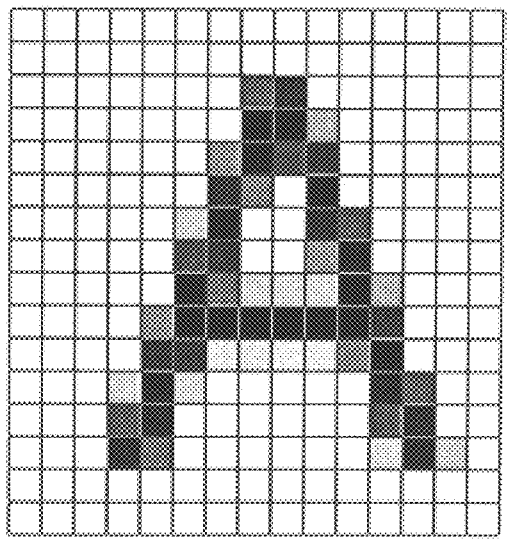
FIG. 11C is a 12 point Helvetica character from FIG. 5, shifted rightwardly by two pixels, scaled down by a factor of 3 and filtered to produce an anti-aliased gray-scale bitmap of the character, shifted rightwardly by two-thirds of a pixel-to-pixel spacing.

FIG. 11C shows a third rendition of the character of FIG. 5 as carried out upon the compressed character image template with an effective shift to the right of two pixels. Following such shift, the character is scaled by a factor of 3 and filtered to produce an anti-aliased gray-scale version thereof. The character, when displayed, will appear to the viewer as having been shifted by about two-thirds of the pixel-to-pixel spacing in a rightward direction.

Figure 12A:
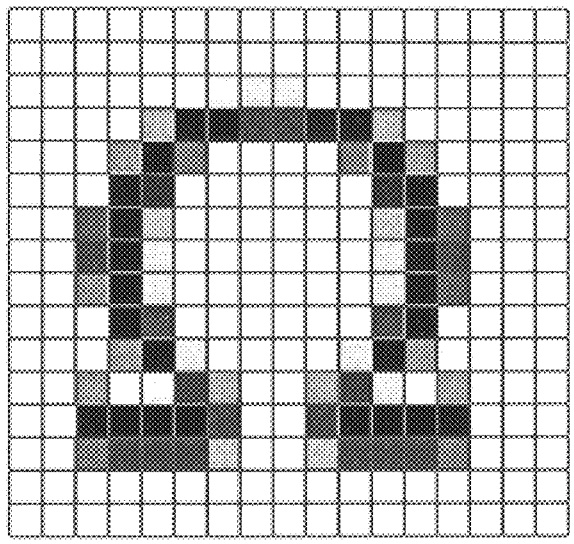
FIG. 12A is a photograph of a 12 point symbol character corresponding with FIG. 6 scaled down by a factor of 3 and filtered to produce an anti-aliased gray-scale bitmap of the symbol.

FIG. 12A shows the result of filtering and scaling the compressed display character image template corresponding, with the symbol of FIG. 6. As before, the display character symbol represented is at a 12 point size (shown in magnified form) with a possible 16 grayscale variations. No sub-pixel adjustment is present in this FIG. 12A rendition. Looking to FIG. 12B, the same display character symbol is revealed, as before, having been scaled by a factor of 3 and filtered to produce anti-aliasing. However, the compressed character image template version of the symbol of FIG. 6 has been adjusted by a one pixel shift to the right. This results, as before, in a perceived shifting of the display character symbol by the observer to an extent of about one-third of the display pixel-to-pixel spacing.

Figure 12B:
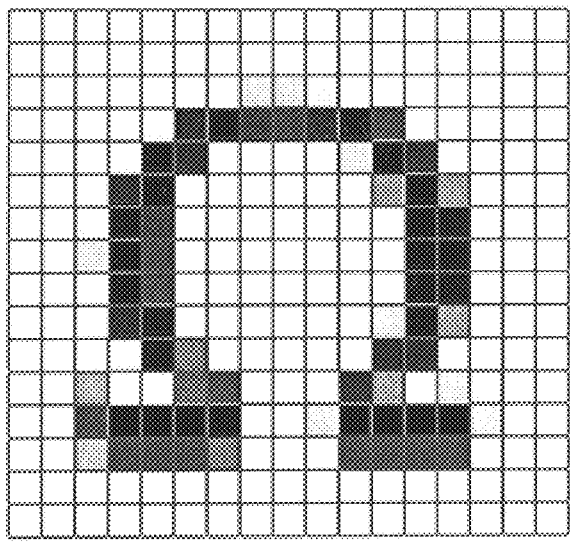
FIG. 12B is a photograph of a 12 point symbol character as represented in FIG. 6, shifted rightwardly by one pixel, scaled down by a factor of 3 and filtered to produce an anti-aliased gray-scale bitmap of the symbol shifted rightwardly by one-third of a pixel-to-pixel spacing.
Figure 12C:
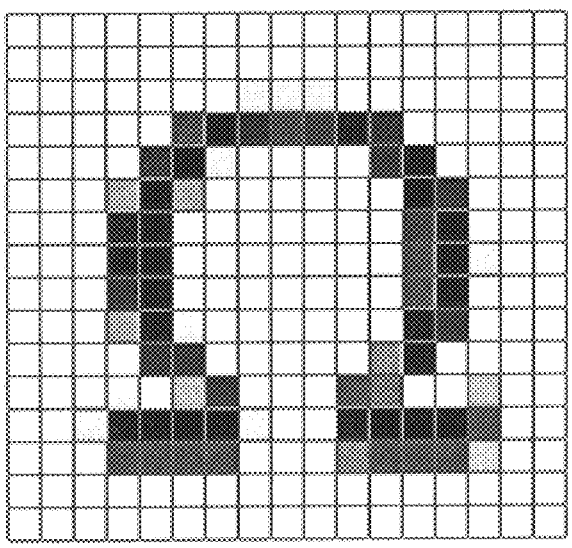
FIG. 12C is a 12 point symbol character from FIG. 6, shifted rightwardly by two pixels, scaled down by a factor of 3 and filtered to produce an anti-aliased gray-scale bitmap of the symbol, shifted rightwardly by two-thirds of a pixel-to-pixel spacing.

In similar fashion, the display character symbol shown in FIG. 12C is representative of the compressed character image template corresponding with the character shown at FIG. 6 with a rightward two pixel shift accompanied by a scaling and filtering to produce anti-aliasing. When perceived at a display, the display character symbol will appear shifted to the right by two-thirds of a pixel-to-pixel spacing. As before, the sub-pixel adjustment carried out is only in a horizontal direction to minimize computational expense without a discernible loss of image quality.

The technique by which the phase shifted and anti-aliased characters may be generated within the bounds of computational and storage practicability is achieved by the above-described provision of compressed character image templates within an image font file accompanied by the procedures carried out by client software at a given platform as set forth in the discourse to follow.

Figure 13B:
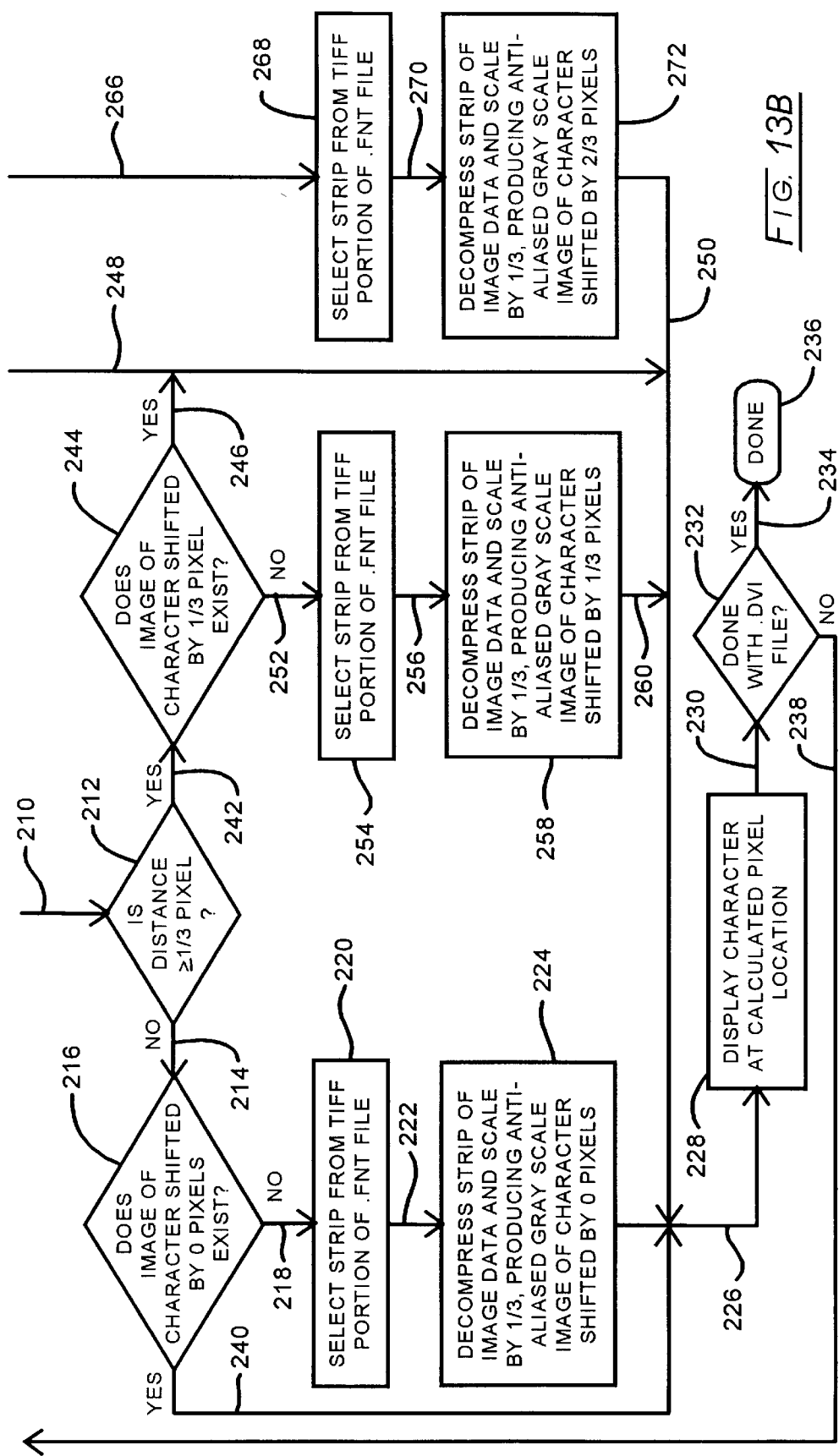

Referring to FIGS. 13A and 13B, a flow chart is presented describing the method for displaying text in conjunction with the image font file at a platform using client software, for example the browser "Hot Java". The display procedure performing with the downloaded DVI file commences as represented at block 190 in FIG. 13A. At that block, the DVI typesetting specification file is analyzed to determine the character code, the font involved, and the position of the next character. It may be recalled that the DVI file provides a very accurate indication of where the character should go, for example with a resolution of 64,000 to 1. As represented at line 192 and block 194, a query is made as to whether the requisite font has been downloaded. In the event that it has been downloaded, then the program continues as represented at line 196. If the query posed at block 194 results in a negative determination, then as represented at line 198 and block 200, the image font file (.FNT) is downloaded and the program continues as represented at lines 202 and 196. With the character code including dimensional characteristics associated with the elected font and the character positions thus acquired, then, as represented at block 204, that character position is rounded down to the nearest pixel. Next, a determination is made of the distance from the actual character position so located in a rounded off manner with respect to the ideal desired character position. Thus,. from the typesetting specification (.DVI) file and the given pixel matrix resolution of the display at the platform at hand, the character positional error with respect to ideal location is calculated. This will be seen to be carried out with respect to each character of the text. Then, as represented at line 206 and block 208, a query is made as to whether this error represents a distance greater than or equal to $\frac{2}{3}$ of a pixel-to-pixel spacing, i.e. 2/F. In effect, depending upon the expansion factor elected, a determination is made as to whether the error of positioning is greater than a predetermined portion of the pixel-to-pixel spacing. If the query posed at block 208 results in a negative determination, then as represented at line 210 which reappears in FIG. 13B, the query posed at block 212 is addressed. The inquiry at block 212 determines whether the error or distance from the ideal character location is greater than or equal to $\frac{1}{3}$ of the pixel-to-pixel spacing, i.e. 1/F. In the event that it is not greater than or equal to $\frac{1}{3}$ of a such spacing, here representing a determination whether the error is greater than a predetermined portion of the pixel-to-pixel spacing, then the program is directed as represented at line 214 to the query posed at block 216. This inquiry determines whether an image has already been created for a character having been shifted by 0 pixels. For example, the character represented at FIG. 11A. In this regard, the program stores or caches the characters which are formed, as it were, on the fly at this juncture of the program. Thus, if they exist, they are reused to conserve computational requirements. In the event such character image does not exist, then as represented at line 218 and block 220, the appropriate strip from the TIFF portion of the font (.FNT) file is selected. Recall that this is a compressed character image template corresponding with the expanded version of the character. Then, as represented at line 222 and block 224, the generation of the display character ultimately to be displayed takes place. For the present instance, where no sub-pixel positioning will take place, no effective shifting of the compressed character image template to the right occurs. However, in the course of decompression to achieve the final character image, the compressed data developed which is to be operated upon, generally represents relative transitions from white to black and vice versa. Thus, the instructions associated with block 224 provide for decompressing a strip of image data and scaling by one-third while, additionally, producing an anti-aliased gray-scale image of the character shifted by 0 pixels. Computational time is saved because the anti-aliasing step is performed in conjunction with the decompression step rather than as a separate subsequent step. The resultant anti-aliased image at proper scale is saved in memory or cached so as to be usable again for the text at hand. An aspect of the invention resides in a capability at this juncture of carrying out a "zooming" feature in terms of the size of the character to be displayed. For example, instead of scaling by a factor of 3, scaling may be carried out by a sizing or scaling factor of 2, or at a zero valuation depending upon the originally elected size of the compressed character image template as discussed in connection with FIGS. 5 and 6. Thus, as an additional feature, type sizing can be accomplished in the course of final character image formation or "on the fly".

With the formation, sizing and caching of the display character, then, as represented at line 226 and block 228, the display character is published or displayed at the calculated pixel location. Then, as represented at line 230 and block 232, a query is posed as to whether the entire text has been displayed as presented with the typesetting specification (.DVI) file. In the event it has, then as represented at line 234 and node 236, the procedure is completed. Where further text is to be displayed, then as represented at line 238, extending to block 190 in FIG. 13A, the next character is accessed and the procedure repeated.

Returning to block 216 in FIG. 13B, where a determination is made that a display character image of the type desired is cached or present in temporary memory, then as represented at lines 240 and 226, that character is selected for display and the program continues.

Returning to block 212, where the query posed there determines that the error distance is greater than one-third pixel for the instant demonstration, then as represented at line 242 and block 244, a determination is made as to whether a character image shifted by one-third pixel exists, i.e. a character or symbol formed to achieve the result exemplified in FIGS. 11B or 12B. It may be recalled that, for an expansion factor, F, of 3, this will be carried out, in effect, by shifting the character image template representing larger expanded character to the right one pixel and then scaling it by ⅓. Where such a display character has been computed, then as represented at lines 246, 248, and 250, the program utilizes that cached character and carries out its display as represented at block 228.

Where the determination at block 244 shows that no such display character image exists, then it will be created. In this regard, the program progresses as represented at line 252 and block 254 to select the appropriate strip from the TIFF portion of the font (.FNT) file. Then, as represented at line 256 and block 258 the compressed character image template corresponding with the character at hand is accessed and, operating upon the compressed image template as opposed to a full bitmap representation thereof, a decompression to identify image transitions is carried out. Then a template shift, for the present demonstration of one pixel in that image is effectively developed and scaling and filtering to derive an anti-aliased display character at the appropriate font size, for example, resulting in a character or symbol as described in connection with FIGS. 11B or 12B. This character will be perceived at the display as being shifted rightwardly in the sense of the viewer's vision an amount corresponding with about one-third of the pixel-to-pixel spacing at the display. The amount of such spacing or sub-pixel positioning will depend upon the desires of the system designer in electing the value of the expansion factor, F. Also, by varying the scaling or sizing factor, the noted zoom feature for selecting character size on the fly is made available. The formed character data is temporarily stored or cached for use with the presently generated text display. Following the formation and caching thereof, then as represented at lines 260, 250, and 226, the display character is displayed at the calculated pixel location and the program proceeds.

Returning to the query at block 208 in FIG. 13A, where it is determined that the positional error for the character at hand is of an amount, for the instant demonstration, greater than two-thirds of the pixel-to-pixel spacing at the display, then as represented at line 262 and block 264, a determination is made as to whether an image of the requisite character shifted by two-thirds of a pixel-to-pixel spacing has already been created for this text display. Where that is the case, then the program proceeds to display the cached character as represented at earlier-described line 248. Where a determination is made that such a display character has not been created for the instant text, then as represented at line 266 extending to block 268 in FIG. 13B, an appropriate character assigning strip from the TIFF portion of the font (.FNT) file is selected. Then, as represented at line 270 and block 272, a procedure substantially similar to that described in connection with blocks 224 and 258 is carried out. Decompression is carried out to the extent of identifying character image transitions. The compressed character image. template then.is caused effectively to be shifted by two pixel positions rightwardly. Next, still working upon the treated but still compressed data, the program scales and filters the compressed and shifted character image template to produce a display character. The display character will be perceived by the display viewer as having been shifted rightwardly an extent amounting to about two-thirds of a pixel-to-pixel spacing for the instant demonstration. As indicated earlier, however, the scaling of the character may be varied in accordance with the desires of the system designer to zoom to a larger or smaller character size by controlling the scaling procedure. Following formation of the desired character, it is cached or stored in temporary memory for the purpose of the instant text display and the program continues as represented at earlier-described line 250.

Figure 14A:
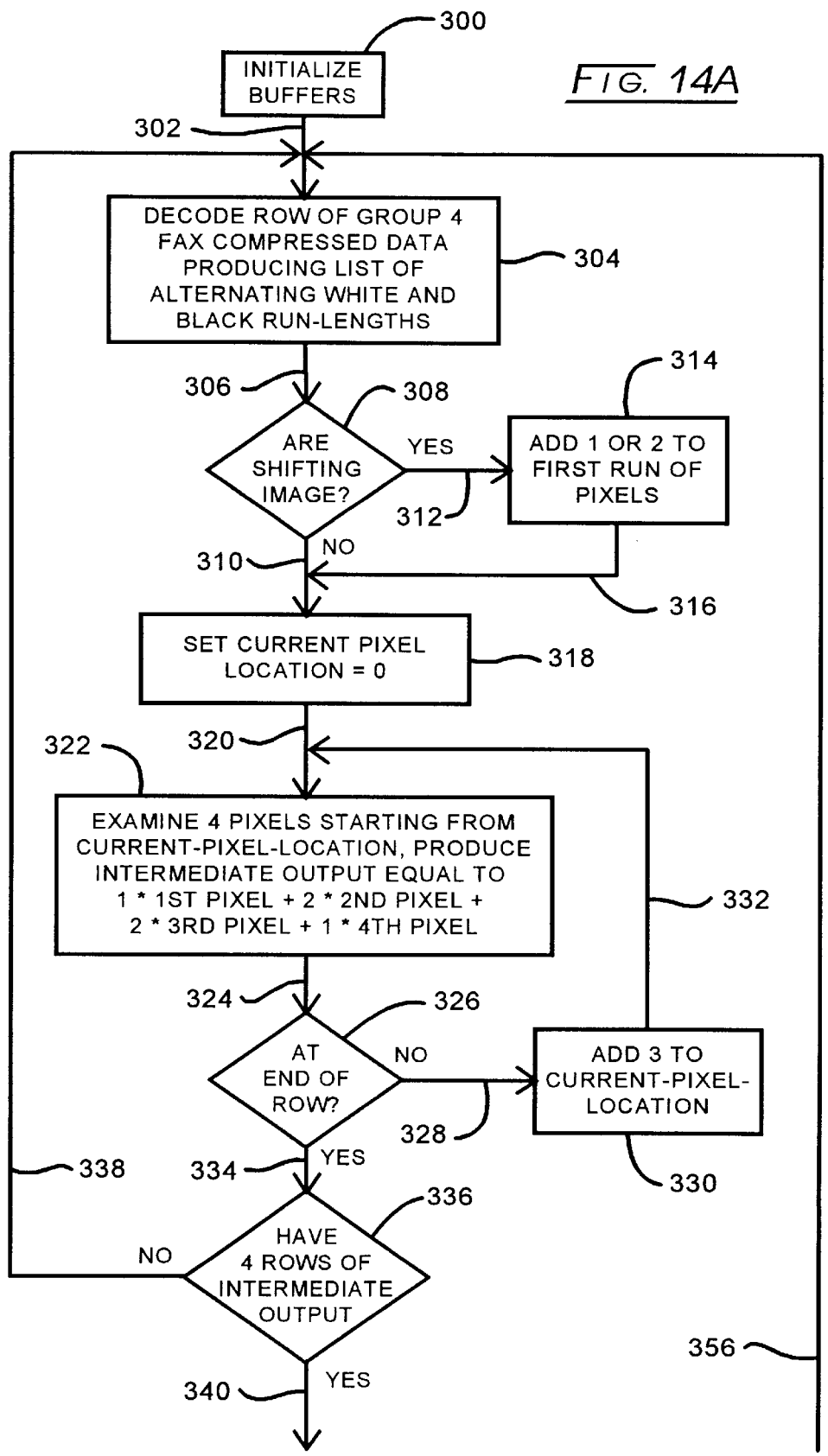
FIGS. 14A and 14B combine to provide a flow chart illustrating the method of character image generation representing a component of the flow chart of FIGS. 13A and 13B.
Figure 14B:
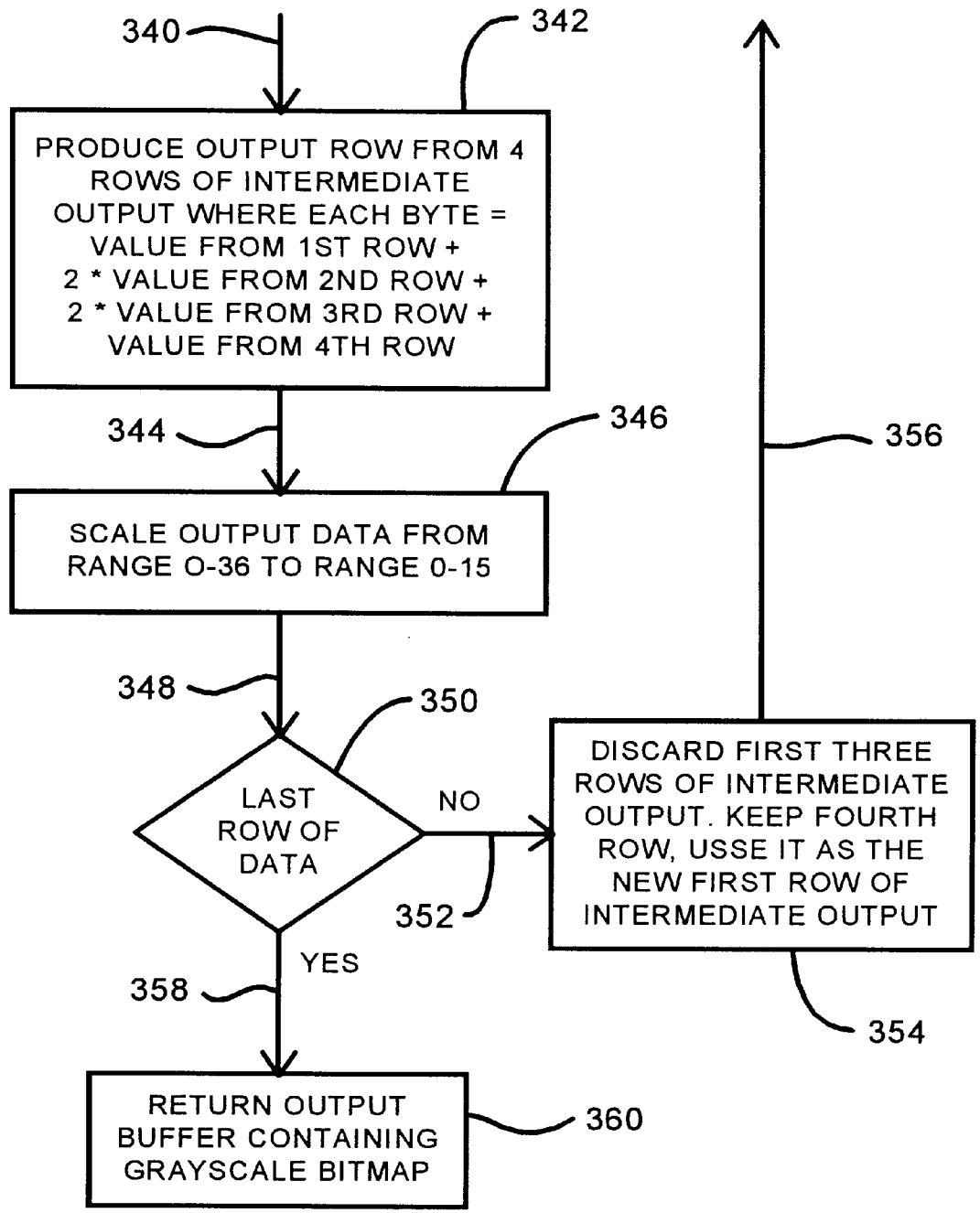
Figure 15:
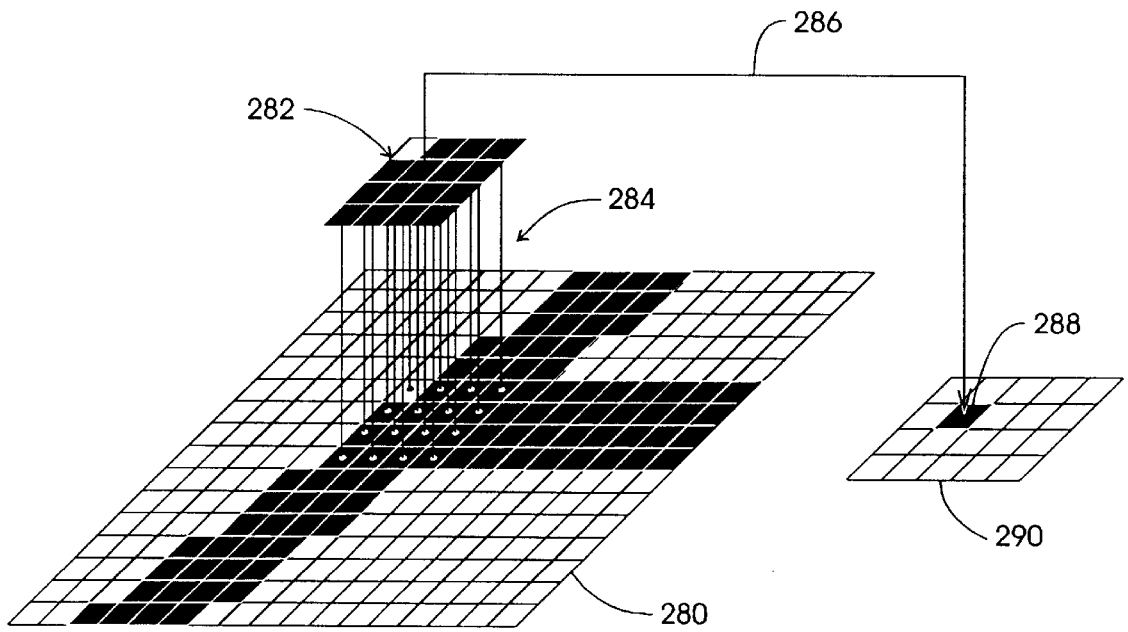
FIG. 15 is a perspective spatial virtual illustration employed to describe the result achieved with the method of the invention.

FIGS. 14A and 14B combine to describe the activities undertaken in connection with earlier-identified blocks 224, 258, and 272 in FIG. 13B. As a prelude to considering that flow chart, however, insight to the result which it accomplishes as opposed to the method by which it accomplishes such result may be gained by initially looking to FIG. 15. FIG. 15 demonstrates the result or effect of the filtering method undertaken with the present invention. In this regard, a portion of an enlarged, non-compressed character image as described in conjunction with FIG. 5 is perspectively displayed at 280, transitions from white pixel related squares and black pixel related squares showing the edges which ultimately define the character shape. Filtering to achieve anti-aliasing as well as scaling may be depicted for illustrative purposes only as a virtual filter template 282 shown positioned above a portion of the character A in the non-compressed image template 280. The virtual filter template 282 is shown having 16 pixel evaluation components each of which is aligned with a given pixel position at 280 as represented by the line array 284 extending between them. Preferably, the pixel locations at the virtual filtering template 282 will be selectively weighted. For the instant demonstration it may be observed that the template 282 is so positioned with respect to the expanded character 280 that it will "see" mostly pixels which are illustrated in black, only one location representing an off character (white) pixel location. With such weighting, a valuation which then may be related to a gray-scale output is made. For the instant valuation, the gray-scale value result will be of a level representing a very dark end of the gray scale. That brightness valuation is shown as only one pixel to achieve a scaling result. Accordingly, the resultant filtered output may be represented by the line 286 pointing to a dark pixel 288 at a character defining grid 290. By, in effect, shifting the virtual filter template 282 three pixel spaces both vertically and horizontally, images such as represented at FIGS. 12 and 13 may be constructed which are scaled by one-third and which are filtered to produce an anti-aliased character. The generating method by which the resultant anti-aliased character is derived is carried out with compressed data and with a virtual filtering template weighting which, in effect, essentially achieves a uniform contribution of the image defining state of each pixel which would be represented in the compressed character image template. By adjusting the scaling shift value from 3 to other sizing factors, the above-noted zoom capability is provided. For example, a larger template character size will be achieved by shifting only two pixel-defining spaces and still a larger character at the original template size will carry out a shifting of only one pixel position to evoke a 1:1 ratio.

Figure 16:
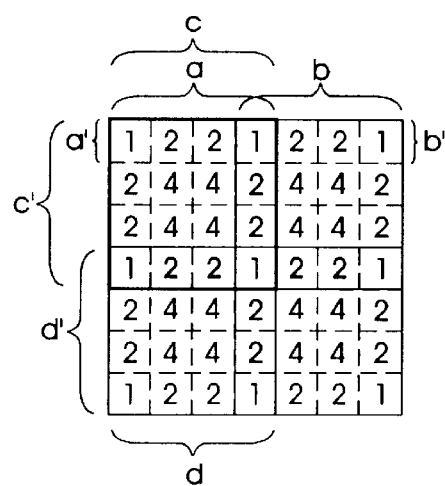
FIG. 16 is a bitmap virtual representation of a filter template illustrating a result achieved with the method of the invention.

The program of FIGS. 14 commences in FIG. 14A with block 300 providing for the initialization of buffers. Then, as represented at line 302 and block 304, instructions are provided for decoding a row of Group 4 fax compressed data producing a list of alternating black and white run lengths. While the term "decompress" is employed in conjunction with blocks 224, 258, and 272 in FIG. 13B, it is of a limited variety. For the instant purpose, for example, the differences in the transition positions between black and white from the previous line will be presented as the data. This is converted to a location of run lengths identifying transitions between white and black pixel positions. The latter terms "white" and "black" are relative, simply ultimately indicating the edge definition for a character or symbol. Of course, in addition to these black-white transitions, other colors may be involved in the creation of a character or symbol. In this regard, gray-scale anti-aliasing forms of filtering also can take place with variations of brightness in a hue. Following this row-by-row transition differentiation, then, as represented at line 306 and block 308, a determination is made as to whether an image shift is to be carried out to produce phasing or sub-pixel shifting. Recall that this sub-pixel shifting is carried out by what, in effect, is a pixel shift to the right at the compressed character image template. In the event that no such shifting is to occur, then the program continues as represented at line 310. However, where sub-pixel positioning is to occur, then as represented at line 312 and block 314, the values 1 or 2 are added to the first run of pixels. This will create a rightward image shift. Where the subject matter of block 258 as set forth in FIG. 13B is at hand, the value of one pixel is added, whereas, if the subject matter of block 272 is at hand, then a value of two pixels is added. In effect, the character is shifted to the right by adding the value of one or two pixels at the left. The program then continues as represented at lines 316 and 310 to the instructions at block 318. This is the commencement of a row-by-row filtering process with an identification of the current pixel location as being 0. Commencing with this instruction, a sub-filtering activity is undertaken across each horizontal row of the compressed character image template while that template is scaled to the desired display character size. For the present demonstration, the scaling is by a factor of one-third, the compressed character image template being three times the originally desired font size. With this demonstration wherein F=3, sub-pixel positioning or spacing occurs in thirds. The sub-filtering procedure commences as represented at line 320 and block 322 where the equivalent of four pixels in a horizontal row are evaluated or examined with a virtual filter template starting from the current pixel location initially set to 0 as represented at block 318. The positions for these four pixel locations are given a weighting respectively from first to fourth of 1, 2, 2, 1. These are multipliers or multiplying factors applied, for example, as a multiplier of 1 in the presence of a "black" pixel and multiplied with 0 in connection with a "white" pixel. The convention for selecting a binary value for black or white is a matter of design selection. While, as noted above, this virtual sub-filtering procedure is carried out in conjunction with run length data defining transitions, it can be illustrated on a spatial basis. Looking momentarily to FIG. 16, and assuming a bitmap representation of the character image template as illustrated earlier in FIG. 15 at 280, then an initial horizontal row is examined for x pixel positions (here four positions) as outlined by the brackets a and a'. Note that for the pixel positions identified, a weighting of 1, 2, 2, 1 is provided. The sum of those four or x weighted examinations then represents a sub-filtering value, it being noted that the weighted multiplications shown in block 322 are added together. The sub-filtering procedure then continues as represented at line 324 and block 326. At block 326, the query is posed as to whether the sub-filtering operation has reached the end of a given horizontal row. If it has not, then as represented at line 328 and block 330, the value of three pixel positions is added.to the current pixel location and as represented at line 332, this sub-program loops to line 320 to carry out a next sub-filtering operation. The activity represented at block 330 is the scaling or sizing factor activity. Again looking to FIG. 16, this horizontal shift by three pixel locations would position a template for the first row at the location bracketed at b and b'. Note, when this virtual filter template positioning occurs, the fourth pixel position in the template with a weighting value of 1 for the position, a, now becomes the first template position with a weighting value of 1 as the template shifts to a location, b. Thus, a pixel is evaluated twice for that location at this stage of the program Returning to FIG. 14A, the procedure of sub-filtering by successive row examination and weighting continues until, as represented at line 334 and block 336, a determination is made as to whether y pixel rows (here four rows) of intermediate output has been accomplished. Where it has not, then as represented at line 338, the procedure loops to a next row of this given character or symbol. However, where a y-pixel or four rows have been completed, then, the program proceeds as represented at line 340 which is seen to reappear in FIG. 14B. Line 340 is directed to the procedure set forth at block 342 where, in effect, the output of a 4×4, 16-pixel virtual x, y filtering template is compiled to generate a gray-scale selection number. Note that in such a template, the second and third horizontal rows are given a weighting of twice the weightings of the first and fourth rows. For the example at hand, the intermediate second and third rows are weighted horizontally as: 2,4,4,2. Considered on a spatial basis in connection with a bitmap which is shown only for illustrative purposes, not representing the method per se, FIG. 16 shows this x,y template in a spatial format as encompassed by brackets c, c'. Because the virtual filtering template is 4×4 and because the scaling for the instant demonstration is in accordance with a ⅓ value or a scaling or sizing factor of 3, by providing the weighting shown at c, c' in FIG. 16, as the template is effectively moved horizontally three spaces and vertically three spaces, each pixel position essentially is evaluated identically with each other pixel position to achieve a final gray-scale value for each display character pixel position. Spatial representation of a vertical (y) shift of the filtering template is represented in FIG. 16 within brackets d, d'. In the figure, it is seen that the top left and top right pixels within the d, d' brackets as shifting occurs both horizontally and vertically will be evaluated or examined four times while those four pixel locations located at the center of the filtering template will be examined once, thus they are weighted at a value of 4.

Returning to FIG. 14B, this arrangement continues to be described in connection with line 344 and block 346. Because the total weighted valuation for 16 pixels under the conditions described above will range from 0 to 36, for gray-scale level convenience, that value is scaled to a range of 0–15. Next, as represented at line 348 and block 350, a query is posed as to whether the last row of data has been encountered. In the event that it has not, then as represented at line 352 and block 354, the first three rows of intermediate output are discarded. The fourth row sub-filtering intermediate output is retained and used as the new first row of intermediate output. This has been described above in connection with the y-spatial shift from the template at c, c' to the location d, d'. Because the last row of data has not been reached, the program loops as represented at line 356 which is seen in FIG. 14A to extend to line 302.

Thus, to achieve sub-pixel positioning within practical bounds of computation and storage, characters and symbols are created, as it were "on the fly", and in conjunction with compressed data, and a temporary cache, as opposed to precomputing all of the character renditions and symbol renditions and storing them at otherwise requisite enormous, megabyte levels.

Returning to FIG. 14B, where the last row of data is encountered, then as represented at line 358 and block 360, the output buffers return containing a gray-scale bitmap to produce the display, for example as represented in FIGS. 2, 11, and 12.

Since certain changes may be made in the above-described method and system without departing from the scope of the invention herein involved, it is intended that all mater contained in the description thereof or shown in the accompanying drawings shall be interpreted as illustrative and not in a limiting sense.

We claim:

1. A method for generating typeset characterized text, at a platform display exhibiting limited display pixel-to-display pixel spacing resolution, said text having a predetermined font of characters of select character pixel defined font type and font size, and said text being conveyed from a server to client software at said platform, comprising the steps of:

I. providing an image font file as a compressed bit map representation of each of said characters of said font, derived as a compressed character image template corresponding with a font size representing an expansion factor, F, based scaling of said predetermined font select size;

II. providing a device independent typesetting specification file for said text and said predetermined font of characters such typesetting specification representing the ideal location of each character of said text at a display;

III. conveying said image font file and said typesetting specification file to said client software; and IV. at said platform:
   (a) determining any positional error from said typesetting specification file and said display pixel-to-display pixel spacing resolution said positional error being derived with respect to said ideal location for each character of said text when located at the nearest display pixel available at said display,
   (b) determining for a text character whether said error is greater than a predetermined portion of said pixel-to-pixel spacing,
   (c) accessing said image font file for said compressed character image template corresponding with said text character,
   (d) shifting said compressed character image template in a predetermined direction an amount representing at least one character image template pixel when said determination (b) is that said error is greater than said predetermined portion of said spacing,
   (e) filtering and scaling said compressed character image template to derive an anti-aliased display character of said select font size,
   (f) displaying said display character at said platform display, and
   (g) reiterating steps (a) through (f) for characters of said text.

2. The method of claim 1 wherein said step IV(b) determines for a said text character whether said error is greater than 1/F of said pixel-to-pixel spacing.

3. The method of claim 1 wherein:
   said step IV(e) filtering is carried out by evaluating pixel representative predetermined lengths of pixel defined sequences of said character image template; and
   said scaling is carried out by horizontally and vertically incrementing said sequences a number of pixel spaces, said number being based upon a selected sizing factor.

4. The method of claim 3 in which said sizing factor is selected as F.

5. The method of claim 1 in which step IV(e) thereof includes the step of decompressing said compressed character image template to an extent determining the image edge transitions contained therein.

6. The method of claim 5 in which said step of decompressing a said compressed character image is carried out by producing a list of alternating representative white and black run-lengths of pixel positions.

7. A method for generating typeset characterized text, at a platform display exhibiting limited display pixel-to display pixel spacing resolution, said text having a predetermined font of characters of select character pixel defined font type and font size, said text being conveyed from a server to client software at said platform, comprising the steps of:

I. providing an image font file as a compressed bitmap representation of each of said characters of said font, derived as a compressed character image template corresponding with a font size representing an expansion factor, F, based scaling of said predetermined font select size, said step I comprising the steps of:
   (a) creating a portable bitmap file for said predetermined font of characters at F times said predetermined font select size,
   (b) creating a Group 4 fax encoded TIFF file corresponding with said portable bitmap file, thereby forming a compressed image template for each character of said predetermined font of characters,
   (c) dividing said TIFF file into strips with one of said strips for each compressed image template corresponding with each character of said predetermined font of characters, and
   (d) creating said image font file from said portable bitmap file and said divided TIFF file strips, II. providing a device independent typesetting specification file for said text and said predetermined font of characters such typesetting specification representing the ideal location of each character of said text at a display;

III. conveying said image font file and said typesetting specification file to said client software; and IV. at said platform:
   (a) determining any positional error from said typesetting specification file and said limited display pixelto-display pixel matrix resolution, said positional error being derived with respect to said ideal location for each character of said text when located at the nearest display pixel available at said display, (b) determining for a text character whether said error is greater than a predetermined portion of said display pixel-to-display pixel spacing, (c) accessing said image font file for said compressed character image template corresponding with said text character, (d) shifting said compressed character image template in a predetermined direction an amount representing at least one character pixel when said determination (b) is that said error is greater than said predetermined portion of said spacing, (e) filtering and scaling said character image template to derive an anti-aliased display character of said select font size, (f) displaying said display character at said platform display, and (g) reiterating steps (a) through (f) for characters of said text.

8. The method of claim 7 in which step I(a) thereof for creating a portable bitmap file comprises the steps of:

selecting a said predetermined font expanded in size at F times said font select size and representing an expanded font;

creating an empty bitmap file with a pixel-based width greater than the maximum width of the characters of said expanded font and having a height greater than 256 times the height of a said character of said expanded font;

rendering each of said characters of said expanded font as character cells within said empty bitmap; and writing the pixel based width, height, acscent and descent of said character cells, the width and height of said bitmap and the raw binary image data representing said character cells to an output file.

9. The method of claim 7 in which:

step I(a) thereof for creating a portable bitmap comprises the steps of:

selecting a said predetermined font expanded in size at F times said font select size and representing an expanded font;

creating an empty bitmap file with a pixel-based width greater than the maximum width of the characters of said expanded font and having a height greater than 256 times the height of a said character of said expanded font;

rendering each of said characters of said expanded font as character cells within said empty bitmap; and writing the pixel based width, height, acscent and descent of said character cells, the width and height of said bitmap and the raw binary image data representing said character cells to an output file;

step I(b) thereof for creating a Group 4 fax encoded TIFF file comprises the steps of:

extracting said character cell width and height;

trimming the said pixel-based width of said bitmap file to equal said extracted character cell width; and creating a Group 4 fax encoded TIFF file from the trimmed bitmap file with compressed character image template data representing said character cells.

10. The method of claim 7 in which:

step I(a) thereof for creating a portable bitmap file comprises the steps of:

selecting a said predetermined font expanded in size at F times said font select size and representing an expanded font;

creating an empty bitmap file with a pixel-based width greater than the maximum width of the characters of said expanded font and having a height greater than 256 times the height of said character of said expanded font;

rendering each of said characters of said expanded font as character cells within said empty bitmap; and writing the pixel based width, height, acscent and descent of said character cells, the width and height of said bitmap and the raw binary image data representing said character cells to an output file;

step I(b) thereof for creating a Group 4 fax encoded TIFF file comprises the steps of:

extracting said character cell width and height;

trimming the said pixel-based width of said bitmap file to equal said extracted character cell width; and creating a Group 4 fax encoded TIFF file from the trimmed bitmap file with compressed character image template data representing said character cells;

step I(c) thereof for dividing said TIFF file into strips comprises the steps of:

for said character cells of said TIFF file, copying said compressed character image template data corresponding with a said character into buffer as a strip;

writing a TIFF header for said strip;

retaining only that compressed character image template data which is unique; and writing TIFF tags to derive a new multi-stripped TIFF file.

11. The method of claim 7 in which:

step I(a) thereof for creating a portable bitmap file comprises the steps of:

selecting a said predetermined font expanded in size at F times said font select size and representing an expanded font;

creating an empty bitmap file with a pixel-based width greater than the maximum width of the characters of said expanded font and having a height greater than 256 times the height of a said character of said expanded font;

rendering each of said characters of said expanded font as character cells within said empty bitmap; and writing the pixel based width, height, acscent and descent of said character cells, the width and height of said bitmap and the raw binary image data representing said character cells to an output file;

step I(b) thereof for creating a Group 4 fax encoded TIFF file comprises the steps of:

extracting said character cell width and height;

trimming the said pixel-based width of said bitmap file to equal said extracted character cell width; and creating a Group 4 fax encoded TIFF file from the trimmed bitmap file with compressed character image template data representing said character cells;

step I(c) thereof for dividing said TIFF file into strips comprises the steps of:

for said character cells of said TIFF file, copying said compressed character image template data corresponding with a said character into buffer as a strip;

writing a TIFF header for said strip;

retaining only that compressed character image template data which is unique; and writing TIFF tags to derive a new multi-stripped TIFF file;

step I(d) thereof for creating said image font file comprises the steps of:
extracting said width, height, ascent and descent data of said character cells derived in said step I(a);
writing out identification bytes for said image font file;
writing out the size of the header of said image font file;
writing out said extracted width, height, ascent and descent data into said image font file header; and
copying the contents of said multi-stripped TIFF file to said image font file.

12. A method for generating typeset characterized text, at a platform display exhibiting limited pixel-to-pixel spacing resolution, said text having a predetermined font of characters of selected pixel defined font type and font size, and said text being conveyed from a server to a client software at said platform, comprising the steps of:

I. providing an image font file as a compressed bitmap representation of each of said characters of said font, derived as a compressed character image template corresponding with a font size representing an expansion factor, F, based scaling of said predetermined font select size;

II. providing a device independent typesetting specification file for said text and said predetermined font of characters representing the ideal location of each character of said text at a display;

III. conveying said image font file and said typesetting specification file to said client software; and IV. at said platform:
(a) determining any positional error from said typesetting specification file and said given pixel matrix resolution, said positional error with respect to said ideal location for a character of said text when located at the nearest pixel available at said display,
(b) determining for said character of said text whether said error is greater than a predetermined portion of said pixel-to-pixel spacing resolution,
(c) when said error is determined to be greater than said predetermined portion of said pixel-to-pixel spacing resolution, then determining whether an anti-aliased display character has been generated in accordance with step (g) hereof and cached in temporary memory and, in the event that it has been so cached, then going to step (i) hereof,
(d) when said display character has not been cached, accessing said image font file for said compressed character image template corresponding with said character of said text,
(e) decompressing said accessed compressed character image template to an extent identifying character image transitions from relative black and white runs of pixels,
(f) when said error is determined to be greater than said predetermined portion of said pixel-to-pixel spacing, carrying out an effective shifting of a predetermiend number of pixel positions in a predetermined horizontal direction at said decompressed character image template, to derive a shifted character image template,
(g) then filtering and scaling said shifted character image template to produce an anti-aliased display character of said select font size,
(h) caching said anti-aliased display character in temporary memory,
(i) displaying said display character at said platform display, and
(j) reiterating steps (a) through (i) for characters of said text.

13. The method of claim 12 in which said step (e) of decompressing said accessed compressed character image template is carried out by decoding each row position of said template to produce a list of alternating relative white and black pixel run lengths.

14. A method for generating typeset characterized text, at a platform display exhibiting limited display pixel-to-display pixel spacing resolution, said text having a predetermined font of characters of selected character pixel defined font type and font size, and said text being conveyed from a server to a client software at said platform, comprising the steps of:

I. providing an image font file as a compressed bitmap representation of each of said characters of said font, derived as a compressed character image template corresponding with a font size representing an expansion factor, F, based scaling of said predetermined font select size;

II. providing a device independent typesetting specification file for said text and said predetermined font of characters representing the ideal location of each character of said text at a display;

III. conveying said image font file and said typesetting specification file to said client software; and IV. at said platform:
(a) determining from said typesetting specification file and said display pixel-to-display pixel spacing resolution the positional error with respect to said ideal location for a character of said text when located at the nearest pixel available at said display,
(b) determining for said character of said text whether said error is greater than a predetermined portion of said display pixel-to-display pixel spacing resolution, said predetermined portion being 2/F,
(c) when said error is determined to be greater than said predetermined portion of said pixel-to-pixel spacing resolution, then determining whether an anti-aliased display character has been generated in accordance with step (g) hereof and cached in temporary memory and, in the event that it has been so cached, then going to step (i) hereof,
(d) when said display character has not been cached, accessing said image font file for said compressed character image template corresponding with said character of said text,
(e) decompressing said accessed compressed character image template to an extent identifying character image transitions from relative black and white runs of pixels,
(f) when said error is determined to be greater than said predetermined portion of said pixel-to-pixel spacing, carrying out an effective shifting of at least two character pixel positions in a predetermined horizontal direction at said decompressed character image template, to derive a shifted character image template,
(g) then filtering and scaling said shifted character image template to produce an anti-aliased display character of said select font size,
(h) caching said anti-aliased display character in temporary memory,
(i) displaying said display character at said platform display, and (j) reiterating steps (a) through (i) for characters of said text.

15. The method of claim 14 in which:

said step IV(b) includes a step of determining whether said error is greater than 1/F of said pixel-to-pixel spacing resolution when said error is not greater than 2/F; and said step IV(f) predetermined number of character pixel positions is at least one when said error is greater than 1/F but not greater than 2/F of said display pixel-to-display pixel spacing resolution.

16. The method of claim 15 in which said step IV(f) predetermined number of character pixel positions is zero when the determination of step IV(b) is that said error is less than 1/F of said display pixel-to-display pixel spacing resolution.

17. A method for generating typeset characterized text, at a platform display exhibiting limited display pixel-to-display pixel spacing resolution, said text having a predetermined font of characters of selected character pixel defined font type and font size, and said text being conveyed from a server to a client software at said platform, comprising the steps of:

I. providing an image font file as a compressed bitmap representation of each of said characters of said font, derived as a compressed character image template corresponding with a font size representing an expansion factor, F, based scaling of said predetermined font select size;

II. providing a device independent typesetting specification file for said text and said predetermined font of characters representing the ideal location of each character of said text at a display;

III. conveying said image font file and said typesetting specification file to said client software; and IV. at said platform:

(a) determining from said typesetting specification file and said given pixel matrix resolution the positional error with respect to said ideal location for a character of said text when located at the nearest pixel available at said display, (b) determining for said character of said text whether said error is greater than a predetermined portion of said pixel-to-pixel spacing resolution, (c) when said error is determined to be greater than said predetermined portion of said pixel-to-pixel spacing resolution, then determining whether an anti-aliased display character has been generated in accordance with step (g) hereof and cached in temporary memory and, in the event that it has been so cached, then going to step (i) hereof, (d) when said display character has not been cached, accessing said image font file for said compressed character image template corresponding with said character of said text, (e) decompressing said accessed compressed character image template to an extent identifying character image transitions from relative black and white runs of pixels, (f) when said error is determined to be greater than predetermined portion of said pixel-to-pixel spacing, carrying out an effective shifting of a predetermined number of pixel positions in a predetermined horizontal direction at said decompressed character image template, to derive a shifted character image template, (g) then filtering and scaling said shifted character image template to produce an anti-aliased display character of said select font size, (h) caching said anti-aliased display character in temporary memory, (i) displaying said display character at said platform display, and (j) reiterating steps (a) through (i) for characters of said text, said step (g) comprising the steps of:

(g1) examining a sequence of x pixel positions in an initial row of pixel positions of said character image template with a virtual filter of x successive horizontal pixel positions and y pixel rows, each such position having a select weighting factor, (g2) deriving an intermediate output value representing the sum of the product of each said weighting factor with an associated pixel position, (g3) horizontally shifting said virtual filter along said row a number of pixel horizontal positions corresponding with a select scaling factor, S, and deriving a next said intermediate output value, (g4) reiterating said step (g3) until all pixel horizontal positions along said row have been examined, (g5) reiterating said step (g4) to derive said intermediate values at each row for said y pixel rows, and summing said intermediate values for a said virtual filter x, y orientation of x horizontal pixel position and y rows, and (g6) deriving a gray scale value for a pixel represented by said virtual filter x, y orientation summed intermediate values.

18. The method of claim 17 including the steps of:

(g7) vertically shifting said virtual filter a number of rows corresponding with said select scaling factor, S;

(g8) then reiterating said steps (g5) and (g6) for the entire said character image template and deriving a scaled gray scale bitmap representing said display character.

19. The method of claim 18 in which:

said expansion factor, F, has a value of 3;

said virtual filter x succession of horizontal pixel positions is 4 positions and said y pixel rows are 4 rows; and said scaling factor, s, has a value of 3.

20. The method of claim 19 in which:

said step (g1) select weighting factor for each pixel of said virtual filter x succession of horizontal pixel positions respectively is: 1,2,2,1; and said select weighting factors for successive rows of said virtual filter x, y orientation of four y pixel rows are multiplied by the respective values: 1,2,2,1 subsequent to said step (g1) and prior to said step (g2).

21. The method of claim 19 in which said step (g7) includes the step of discarding the intermediate output values derived from the first three rows of the next previous four y pixel rows.

* * * * *